United States Patent
Oh et al.

(10) Patent No.: US 7,595,964 B2
(45) Date of Patent: *Sep. 29, 2009

(54) METHOD FOR REDUCING OFF TRACK HEAD MOTION DUE TO DISK VIBRATION IN A HARD DISK DRIVE THROUGH THE HEAD GIMBAL ASSEMBLY

(75) Inventors: Dong-Ho Oh, San Jose, CA (US); Seong-Woo Kang, Santa Clara, CA (US); Yun-Sik Han, Santa Clara, CA (US); Young-Hoon Kim, Santa Clara, CA (US); Myeong-Eop Kim, Santa Clara, CA (US); Tae-Yeon Hwang, San Jose, CA (US); Jae-Won Kim, Gyunggi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,801

(22) Filed: Nov. 14, 2006

(65) Prior Publication Data

US 2007/0064335 A1  Mar. 22, 2007

Related U.S. Application Data

(62) Division of application No. 10/619,163, filed on Jul. 10, 2003, now Pat. No. 7,136,260.

(51) Int. Cl.
*G11B 5/60* (2006.01)
(52) U.S. Cl. ............. 360/294.1; 360/244.8; 360/245.3; 360/245.6
(58) Field of Classification Search ............. 360/77.06, 360/254.2, 264.1, 294.4, 244.8, 245.3, 244.2, 360/245.6, 294–294.1
See application file for complete search history.

(56) References Cited

U.S. PATENT DOCUMENTS 4,963,806 A  10/1990  Shinohara et al.

(Continued)

OTHER PUBLICATIONS

Goh, B. Teck et al., Design and Implementation of a Hard Disk Drive Servo System Using Robust and Perfect Tracking Approach, IEEE Transaction on Control Systems Technology, Mar. 2001, vol. 9, No. 2, p. 221-233.

(Continued)

*Primary Examiner*—A. J. Heinz
(74) *Attorney, Agent, or Firm*—GSS Law Group; Earle Jennings

(57) ABSTRACT

Improved head gimbal assemblies reducing TMR (Track Mis-Registration) in a hard disk drive are provided. These head gimbal assemblies are as mechanically simple as contemporary head gimbal assemblies, support parallel flying sliders over flat disk surfaces, and reduce TMR induced by disk vibration. They are easier to build, more reliable, and cost less to make, than other known approaches at comparable track densities and rotational rates. The improved head gimbal assemblies include three sets of mechanisms for moving the slider parallel the disk surface, when the disk surface is flat, and radially moving the slider toward the track, when the disk surface is bent. The first and third mechanisms as well as the second and third mechanisms can be used together in a head gimbal assembly. An improved and distinctive servo-controller scheme resulting in an overall improvement in PES performance, particularly when applied to hard disk drives employing the invention's TMR reduction mechanisms. The servo-controllers trade off gain in the disk vibration frequency range, in favor of, increased rejection of low frequency disturbances. This leads to the lowest PES statistics, when applied to hard disk drives with the TMR reduction mechanisms of the invention.

16 Claims, 21 Drawing Sheets

U.S. PATENT DOCUMENTS

| | | | |
|---|---|---|---|
| 5,377,096 | A | 12/1994 | Ono |
| 5,999,369 | A | 12/1999 | Shimizu et al. |
| 6,061,205 | A * | 5/2000 | Finegan .................. 360/234.6 |
| 6,088,192 | A * | 7/2000 | Riener et al. ............ 360/266.1 |
| 6,445,545 | B1 * | 9/2002 | Guo et al. ................ 360/245.1 |
| 6,462,910 | B1 * | 10/2002 | Shimizu et al. ......... 360/244.8 |
| 6,721,133 | B2 | 4/2004 | Takagi et al. |
| 6,738,229 | B2 * | 5/2004 | Williams ................. 360/266.1 |
| 6,766,761 | B1 | 7/2004 | Tamez et al. |
| 6,920,018 | B2 | 7/2005 | Oh et al. |
| 6,958,879 | B2 | 10/2005 | Oh |
| 2002/0093754 | A1 | 7/2002 | Zhang et al. |

OTHER PUBLICATIONS

Hao, Qi et al., TMR Online Optimization Using Quasi-Newton Method for HDD Servo Systems, Procedings of the American Control Conference, Jun. 2000, Chicago, IL, p. 3412-3416.

Li, Yunfeng and Horowitz, Roberto, Active Suspension Vibration Control with Dual Stage Actuators in Hard Disk Drives, Proceedings of the American Control Conference, Jun. 25-27, 2001, p. 2786-2791.

Li, Yunfeng and Horowitz, Roberto, Active Vibration Control of a PZT Actuated Suspension in Hard Disk Drives, Proc. Am. Control conference, Anchorage, AK, May 8-10, 2002, p. 1366-1371.

Li, Yunfeng and Horowitz, Roberto, Mechatronics of Electrostatic Microactuators for Computer Disk Drive Dual-Stage Servo Systems, IEEE/Asme Transactions of Mechatroics, Jun. 2001, vol. 6, No. 2, p. 111-121.

McAllister, S. Jeffrey, The Effect of Disk Platter Resonances on Track Misregistration in 3.5 Inch Disk Drives, IEEE Transactions on Magnetics, May 1996, vol. 32, No. 3, p. 1762-1766.

Y. Li, R. Horowitz, Design and Testing of Track-Following Controllers for Dual-Stage Servo Systems with PZT Actuated Suspensions, Microsystem Technologies 8 (2002), Springer-Verlag 2002, p. 194-205.

* cited by examiner

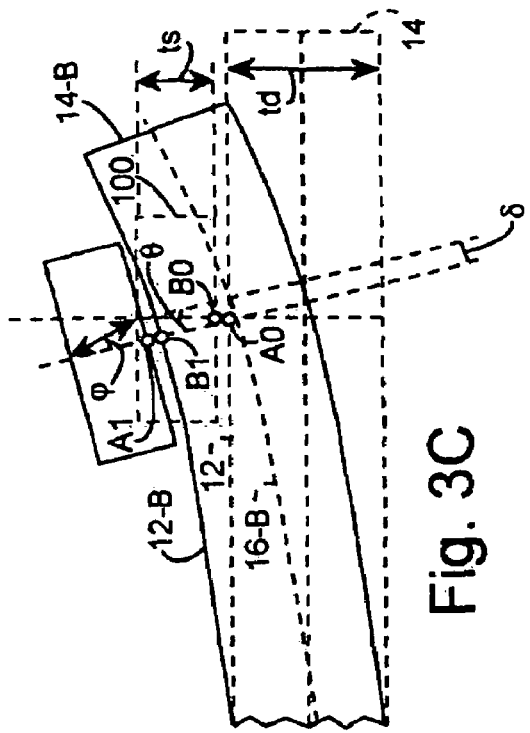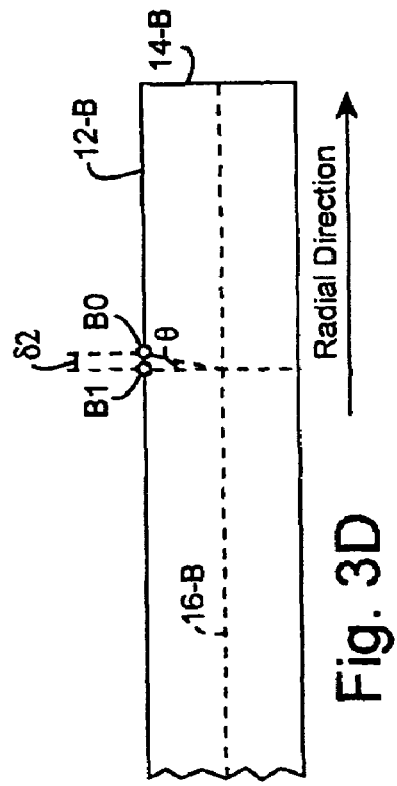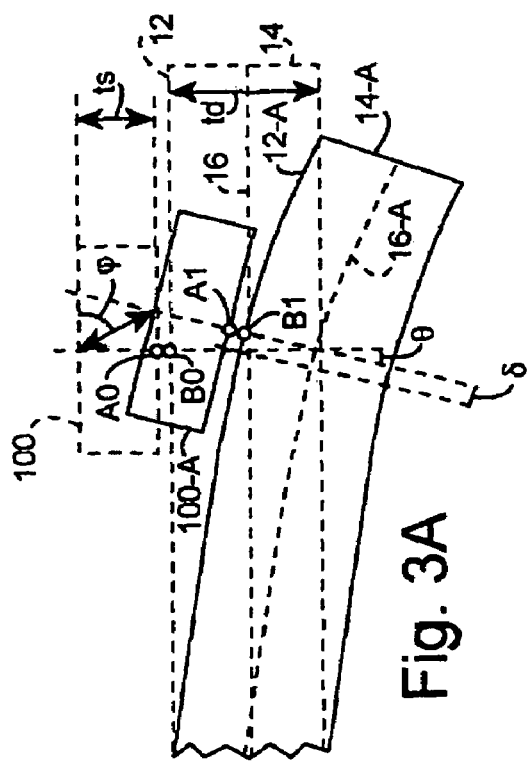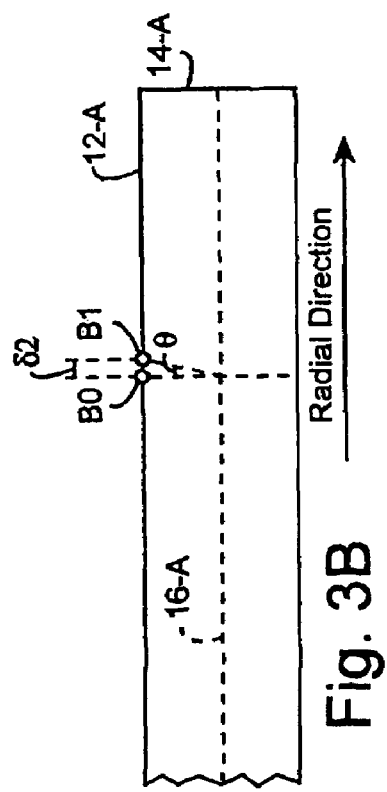
Fig. 3A
Fig. 3B
Fig. 3C
Fig. 3D

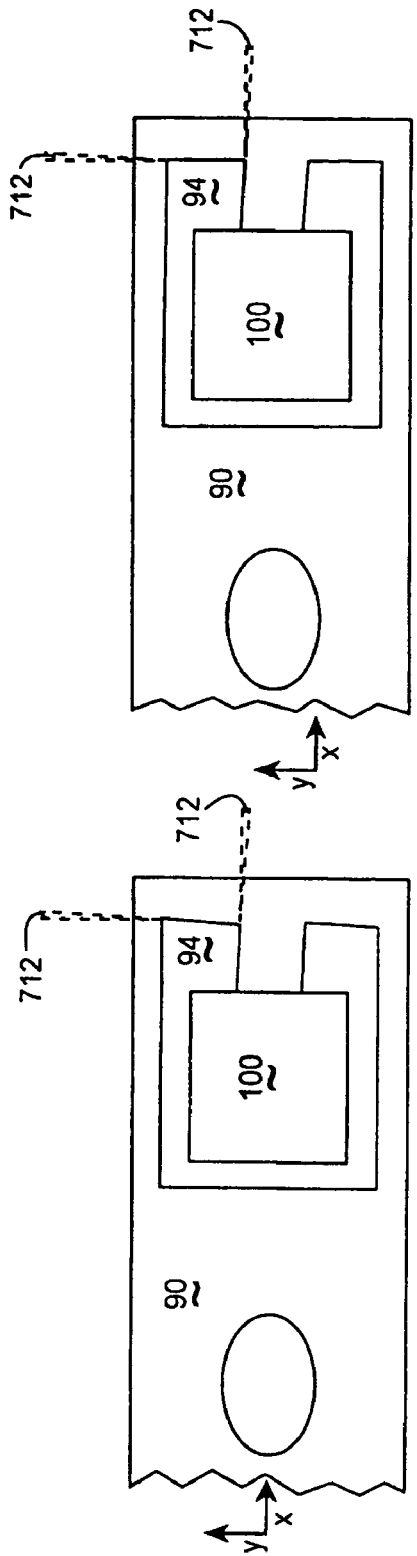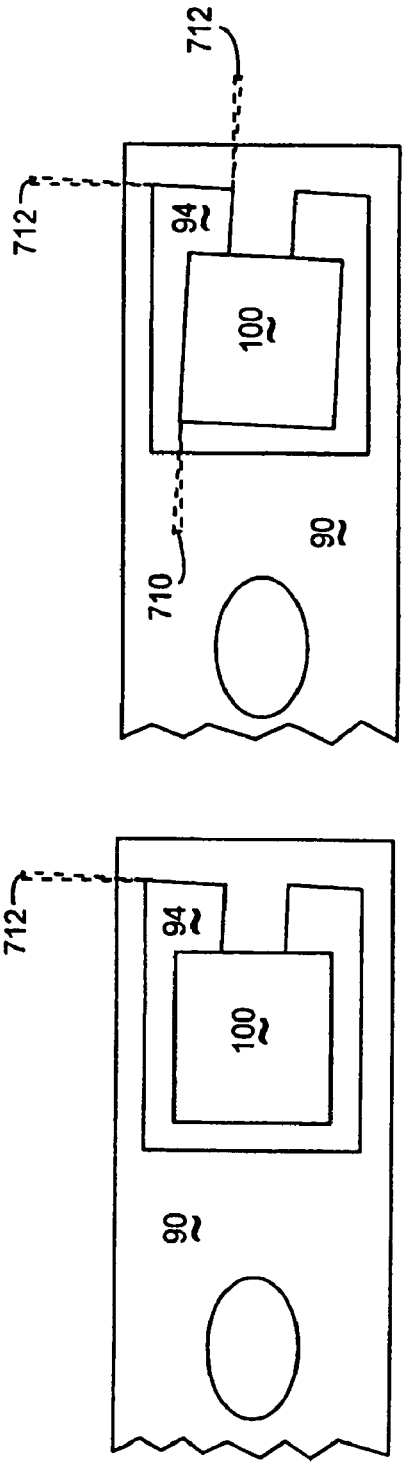

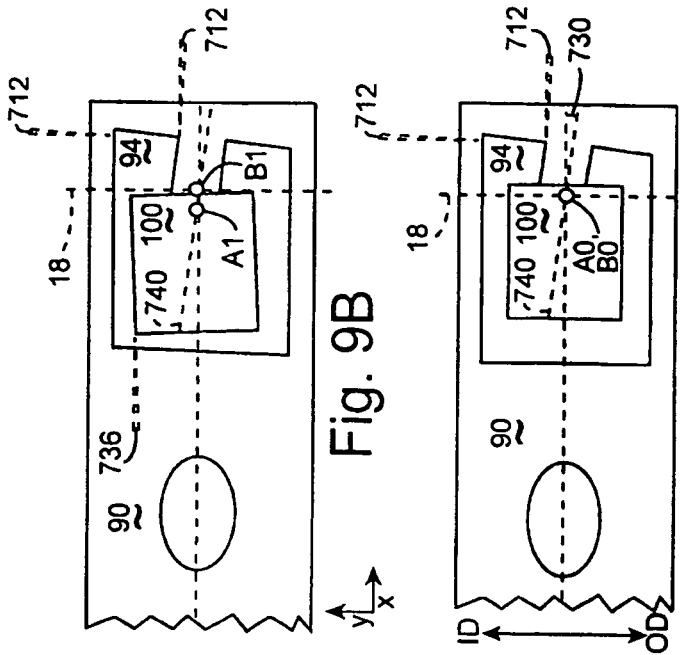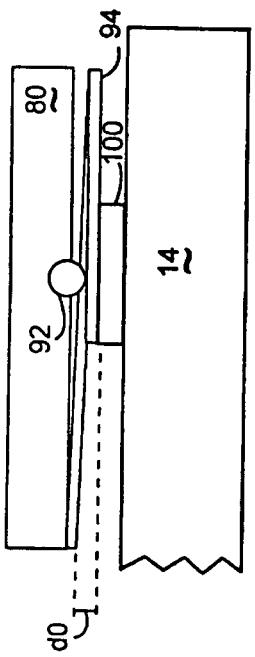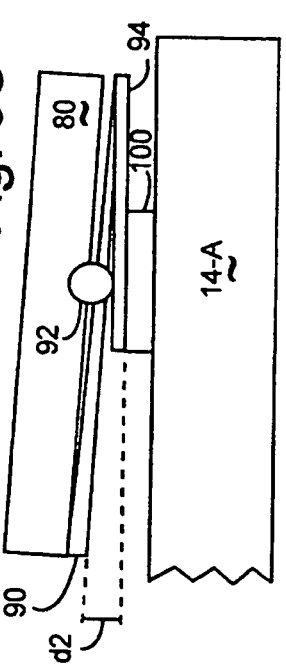

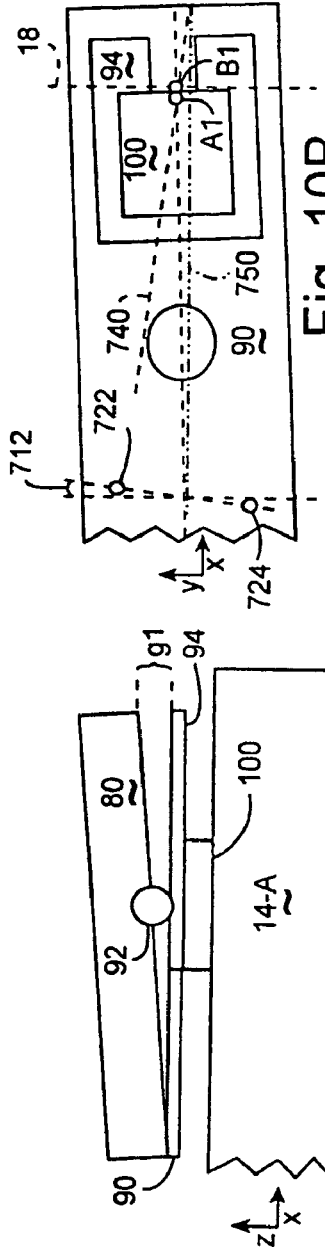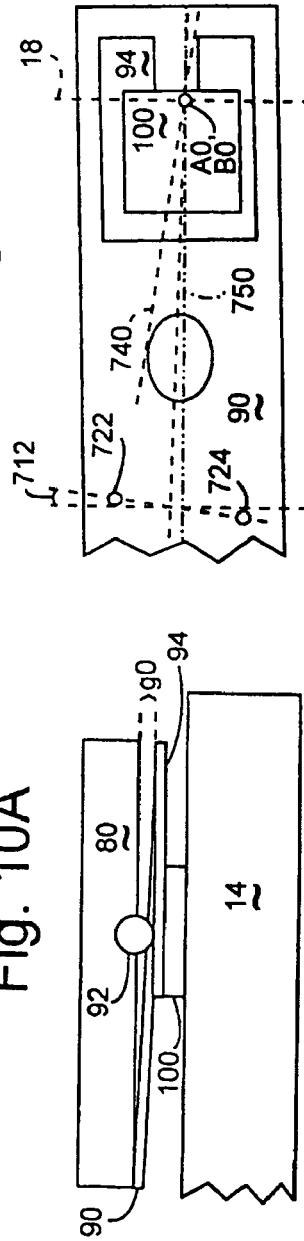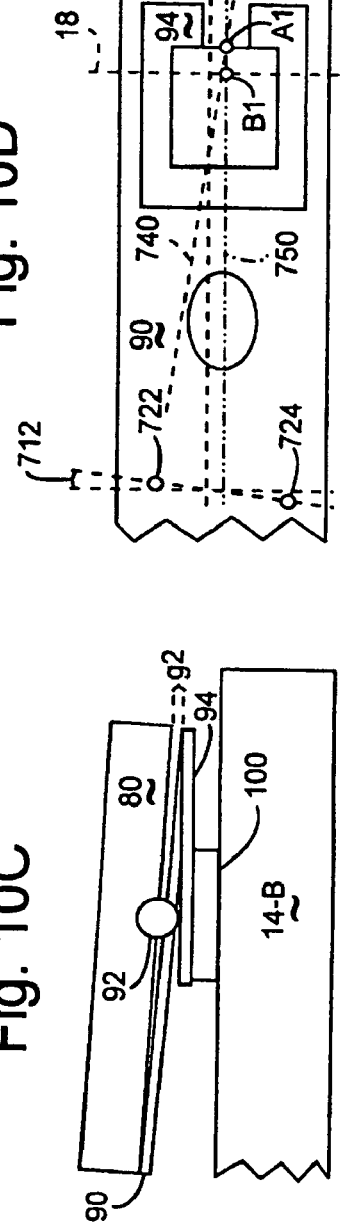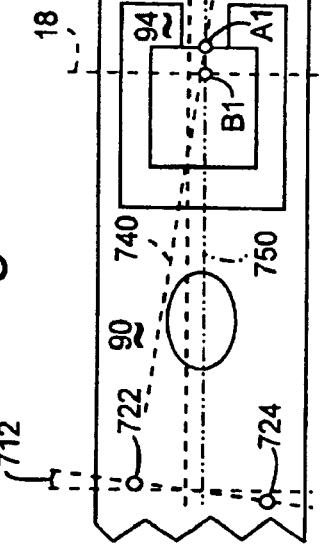
Fig. 10A  Fig. 10B  Fig. 10C  Fig. 10D  Fig. 10E  Fig. 10F

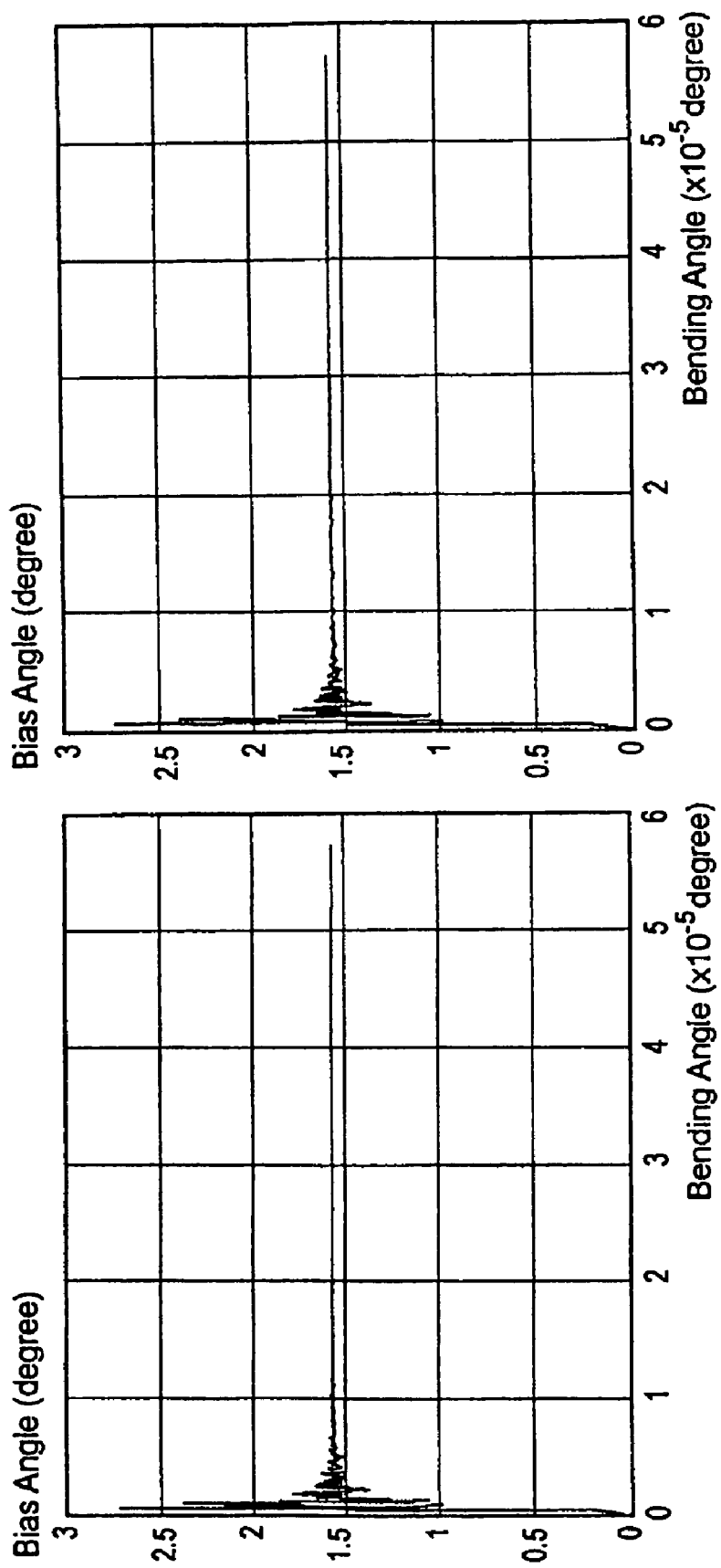

METHOD FOR REDUCING OFF TRACK HEAD MOTION DUE TO DISK VIBRATION IN A HARD DISK DRIVE THROUGH THE HEAD GIMBAL ASSEMBLY

CROSS-REFERENCE TO RELATED APPLICATIONS

This application is a divisional of Ser. No. 10/619,163 filed Jul. 10, 2003, now U.S. Pat. No. 7,136,260.

BACKGROUND OF THE INVENTION

1. Field of the Invention

The present invention relates to head gimbal assemblies and servo controller of a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic field of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is embedded in a slider, which is attached to a flexure arm to create a subassembly commonly referred to as a head gimbal assembly (HGA). The HGA's are attached to an actuator arm. The actuator arm has a voice coil motor that can move the heads across the surfaces of the disks.

Information is stored in radial tracks that extend across the surfaces of each disk. Each track is typically divided up into a number of segments or sectors. The voice coil motor and actuator arm can move the heads to different tracks of the disks and to different sectors of each track.

A suspension interconnect extends along the length of the flexure arm and connects the head to a preamplifier. The suspension interconnect typically comprises a pair of conductive write traces w+, w− and a pair of conductive read traces r+ and r−. One pair of traces, such as the read traces, extend down one side of the flexure arm to the head and the remaining pair of traces extends down the other side of the flexure arm to the head.

The Tracks Per Inch (TPI) in hard disk drives is rapidly increasing, leading to smaller and smaller track positional tolerances. The track position tolerance, or the offset of the read-write head from a track, is monitored by a signal known as the head Positional Error Signal (PES). Reading a track successfully usually requires minimizing read-write head PES occurrences. The allowable level of PES is becoming smaller and smaller. A substantial portion of the PES is caused by disk vibration.

Track Mis-Registration (TMR) occurs when a read-write head tends to lose the track registration. This occurs when the disk surface bends up or down. TMR is often a statistical measure of the positional error between a read-write head and the center of an accessed track. Bending is defined in terms of bending modes. For a positive integer k, a bending mode of (k, 0) produces k nodal lines running through the disk surface center, creating k peaks and k troughs arranged on the disk surface. Bending mode (0, 0) produces no nodal lines, either the entire disk is bent up or bent down.

Two basic prior art approaches are known to lower the Track Mis-Registration (TMR) due to disk vibration. One approach uses head gimbal assemblies providing a radial motion capability. The other approach alters the servo-controller to reduce TMR.

In the first approach, a head gimbal assembly, including a biased load beam, creates a roll center (also known as a dimple center), which provides a radial motion capability as the load beam moves vertically due to disk vibration. This allows sliders to move in a radial direction as well as in a vertical direction with respect to the disks, reducing off-track motion due to disk vibration.

The first approach has some problems. An air bearing forms between the slider face and the disk surface. The slider face is tilted near the disk surface when it is flat. The air bearing becomes non-uniform when the disk surface is flat, adding new mechanical instabilities into the system.

One alternative prior art head gimbal assembly provides a slider mounted so that it pivots in the radially oriented plane about the effective roll axis, which is located within the disk. This scheme does not cause a non-uniform air bearing when the disk surface is flat. However, the way the effective roll axis is placed inside the disk requires a more complex mechanical coupling between the slider support assembly and the slider. This complex mechanical coupling may have a greater probability of mechanical failure, tending to increase manufacturing expenses and to reduce hard disk drive life expectancy.

The second prior art approach to lowering TMR due to disk vibration alters the servo-controller. These servo controllers favor optimization of PES in the disk vibration range without regard for strengthening rejection of low frequency disturbances. The disk vibration range will be considered to include frequencies between about 1K Hz and about 4K Hz. Low frequency disturbances will be considered to include at least the frequencies between about 0 Hz and about 800 Hz.

Accordingly, there exists a need for head gimbal assembly mechanisms providing a stable air bearing, able to follow a track when a disk surface bends, which are easy and reliable to manufacture. There exists a need for servo controllers optimizing PES in the disk vibration range and taking into account potential advantages from strengthened rejection of low frequency disturbances.

BRIEF SUMMARY OF THE INVENTION

The present invention includes improved head gimbal assemblies, which address TMR. These head gimbal assemblies are as mechanically simple as contemporary head gimbal assemblies, support parallel flying sliders over flat disk surfaces, and reduce TMR induced by disk vibration. They may be easier to build, more reliable, and cost less to make, than other known approaches, at comparable track densities and rotational rates. The improved head gimbal assemblies include mechanisms for moving the slider parallel the disk surface, when the disk surface is flat, and radially moving the slider toward the track, when the disk surface is bent, so that the head can more closely follow the track.

In a first set of mechanisms, the actuator arm moves by lever action through a principal axis, with the slider aligned at a bias angle and the slider face parallel to the flat disk surface. The lever action causes the slider to move radially toward the track, when the disk surface is bent.

In a second set of mechanisms, the actuator arms couple to load beams via two fingers. The first finger flexes differently from the second finger when the disk surface is bent. The fingers are constructed so that, when the disk surface is bent, the slider is moved radially toward the track.

A third set of mechanisms move the actuator arm by lever action through the principal axis. The actuator holds the slider parallel to the disk surface, when it is flat. The slider is mounted by a flexure at a second bias angle to the principal axis. The flexure responds as the disk surface bends through the second bias angle, causing the slider to move radially toward the track.

The present invention provides head gimbal assemblies incorporating mechanisms of the first set operating with mechanisms of the third set. The invention alternatively provides head gimbal assemblies incorporating mechanisms of the second set operating with mechanisms of the third set.

The present invention provides a distinctive servo-controller scheme resulting in overall improvement in PES performance, particularly when applied to hard disk drives employing the invention's TMR reduction mechanisms.

The servo-controllers trade off gain in the disk vibration frequency range in favor of increased rejection of low frequency disturbances. This leads to the lowest PES statistics, when applied to hard disk drives with the TMR reduction mechanisms of the invention.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 3A is a cross section view through a disk of a first inventive mechanism operating when the disk surface bends down;

FIG. 3B is a radial-directional view through the disk of the first inventive mechanism, when the disk surface bends down;

FIG. 3C is a cross section view through the disk of the first inventive mechanism operating when the disk surface bends up;

FIG. 3D is a radial-directional view through the disk of the first inventive mechanism operating when the disk surface bends up;

FIGS. 4A to 6A are top views of head gimbal assemblies of the first and second inventive mechanisms;

FIGS. 7B to 8D are views of a head gimbal assembly of the third inventive mechanism;

FIGS. 9A, 9C, and 9E are side views of the radial head motions for head gimbal assemblies of FIG. 8D, resulting from the bending motion of the flexure gimbal induced by disk axial vibration;

FIGS. 9B, 9D, and 9F are top views of the radial head motions for head gimbal assemblies of FIG. 8D, resulting from the bending motion of the flexure gimbal induced by disk axial vibration;

FIGS. 10A, 10C, and 10E are side views of the radial head motions for head gimbal assemblies of FIG. 7B, resulting from the bending motion of the flexure gimbal induced by disk axial vibration;

FIGS. 10B, 10D, and 10F are top views of the radial head motions for head gimbal assemblies of FIG. 7B, resulting from the bending motion of the flexure gimbal induced by disk axial vibration;

FIGS. 15A and 15B are graphs of the results of the bending angle versus the roll bias angle at OD when the disk is respectively bent down and bent up;

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

Disclosed are improved head gimbal assemblies addressing Track Mis-Registration (TMR). These head gimbal assemblies may be as mechanically simple as contemporary head gimbal assemblies, support parallel flying sliders over flat disk surfaces, and reduce TMR induced by disk vibration. They are easier to build, more reliable, and cost less to make, than other known approaches at comparable track densities and rotational rates. The improved head gimbal assemblies include improved suspensions or mechanisms for moving the slider parallel to the disk surface, when the disk surface is flat, and radially moving the slider toward the track, when the disk surface is bent.

Figure 1:
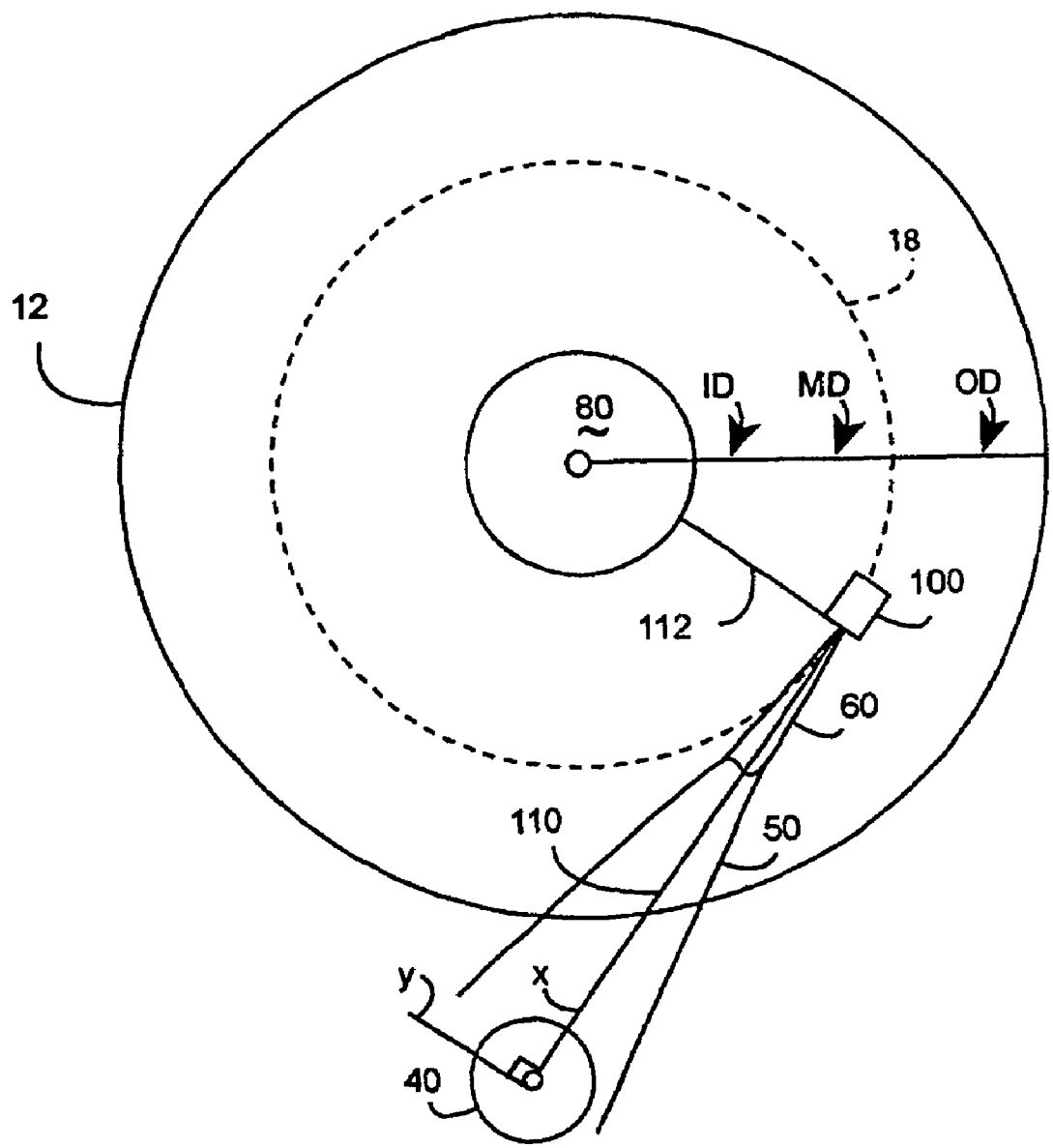
FIG. 1 is a simplified schematic of the relationship between a principal axis of the actuator arm, head gimbal assembly, slider, and radial vector from the center of the spindle hub.

Referring to the drawings, more particularly by reference numbers, FIG. 1 shows an example actuator arm assembly pivoting about the actuator axis 40, changing the angle between the radial vector 112 and the actuator principal axis 110. The actuator arm assembly includes the actuator arm 50 coupled to head gimbal assembly 60, which is coupled to slider 100. Typically, the actuator arm assembly will rotate through various angles between a furthest inside position of the disk and the furthest outside position on the disk. Test data and analyses are provided for three regions of the disk. These are designated ID (corresponding to the furthest inside position), MD (a middle position where radial vector 112 is approximately at a right angle with 110), and OD (the furthest outside position).

In FIG. 1, an X axis extends along the principal axis 110 of the actuator arm, and a Y axis intersects the X axis at essentially actuator pivot 40. When the actuator arm 50 positions the slider 100 so that the read-write head is at MD, the radial vector 112 is nearly parallel to the Y axis. Track 18 is shown near MD, but tracks exist from ID to OD, across the disk surface 12.

The hard disk drive may include a plurality of actuator arms and head sliders located adjacent to the disks all controlled by the same voice coil motor. The heads may have separate write and read elements, that magnetize and sense the magnetic field of the disks.

Figure 2:
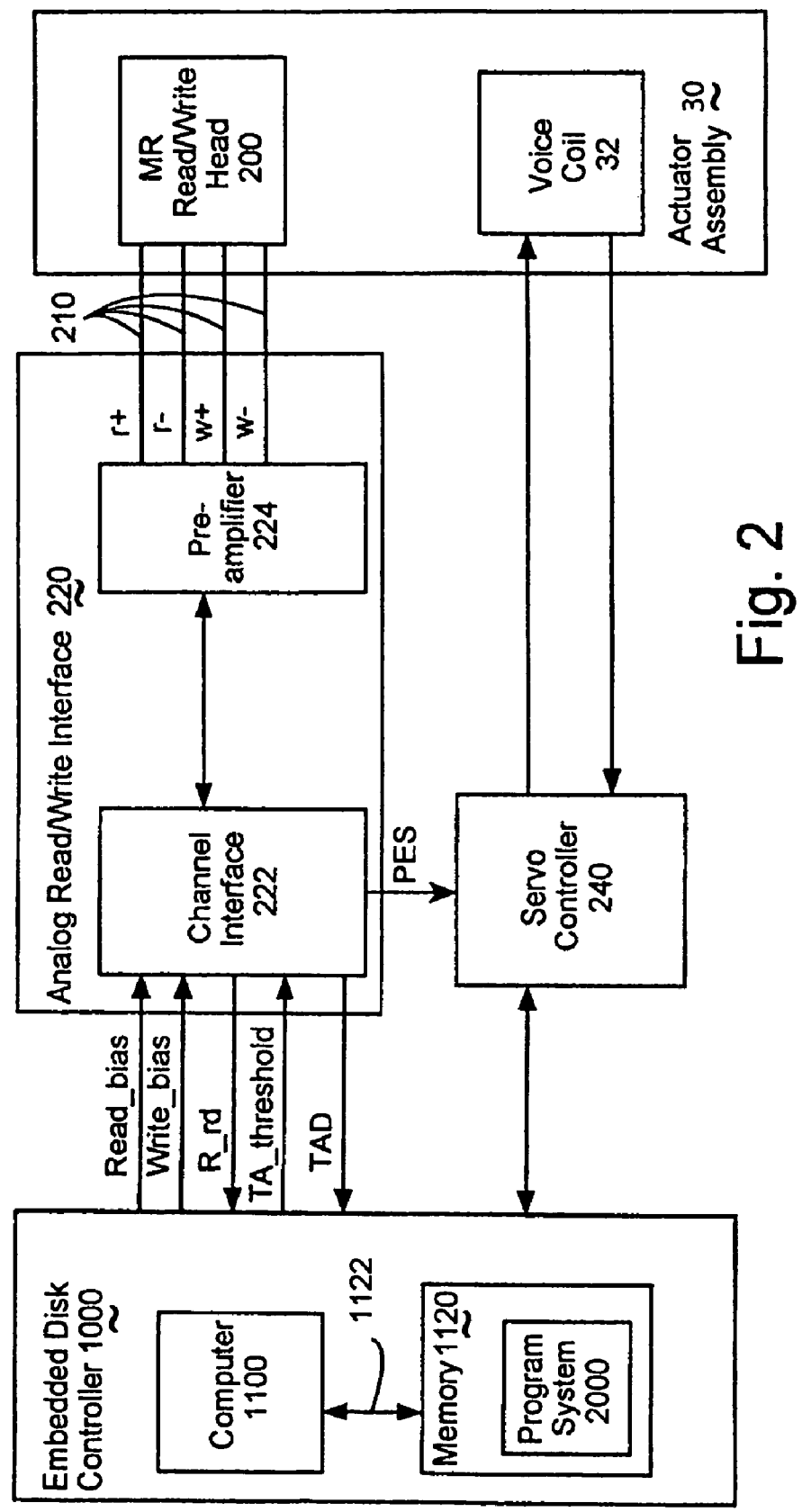
FIG. 2 is a simplified schematic of a disk drive controller controlling a hard disk drive.

FIG. 2 shows a schematic of an example controller system for a disk drive. The controller system includes a voice coil 32 coupled to a magnet assembly to create a voice coil motor. Providing a current to the voice coil 32 creates a torque that swings the actuator arm 50, contained in the actuator assembly 30. Moving the actuator arm 50 moves the actuator arm assembly, which moves the heads across the surfaces of the disk 12.

The hard disk drive may further include a disk drive controller 1000. In FIG. 2, disk drive controller 1000 communicates with an analog read-write interface 220, which in turn communicates the resistivity R_rd found in the spin valve within read-write head 200 to controller 1000. The disk drive controller may include a computer 1100 coupled 1122 to a memory 1120 including a program system 2000. The disk drive controller may provide signals Read_bias, Write_bias, and TA_threshold and also receive signals such as TAD.

The analog read-write interface 220 frequently includes a channel interface 222 communicating with a pre-amplifier 224. The channel interface 222 receives commands from the embedded disk controller 1000, setting the read_bias and write_bias. The analog read-write interfaces 220 may employ either a read current bias or a read voltage bias. For example, the resistance of the read head is determined by measuring the voltage drop across the read differential signal pair (r+ and r−), based upon the read bias current setting read_bias, using Ohm's Law.

In FIG. 2, the channel interface 222 provides a Position Error Signal (PES) to the servo controller 240, which controls voice coil 32 to keep the read-write head close enough to access a data track (such as track 18 of FIG. 1).

The invention includes three approaches for addressing the TMR problem by moving the slider face parallel to the disk surface with respect to the track when the disk surface is flat, and a moving the slider toward the track when the disk surface is bent. Each of these approaches for reducing TMR may be used individually or in combination with other approaches discussed herein or elsewhere.

Actuator assemblies using example mechanisms employing the first approach are seen in FIGS. 4A to 6A and 7A. In these example mechanisms the actuator arm moves by lever action through a principal axis, with the slider aligned at a bias angle and the slider face parallel to the flat disk surface. The lever action causes the slider to move radially toward the track, when the disk surface is bent.

In addition to the example mechanisms employing the first approach, FIGS. 4A to 6A also show actuators with example mechanisms employing the second approach. FIGS. 6B to 6E show actuator assemblies which use only the second approach to reducing TMR. As will be explained further below, the example mechanisms employing the second approach include two fingers coupling the actuator arm to the load beam, where the fingers flex differently from each other when the disk surface is bent. The difference in the response of each finger to the bending of the disk surface is designed to cause the slider to move radially toward the track when the disk surface bends.

FIGS. 7B to 8D show example mechanisms employing the third approach to reducing TMR. In these mechanisms, the slider is mounted by a flexure at a second bias angle to the principal axis. The actuator holds the slider parallel to the disk surface, when it is flat. The flexure responds as the disk surface bends through the second bias angle, causing the slider to move radially toward the track.

In operation, these mechanisms provide a suspension with a roll center movable slider which allows the read-head to follow a track 16 as the disc surface bends down as 16-A and up as 16-B. The read head 100 when disk is bent down is labeled 100-A and when bent up is labeled 100-B. This process is seen more clearly in reference to FIGS. 3A to 3D which show schematically the head-disk interface dynamics. FIGS. 3A and 3B show cross section and radial-directional views through the disk 14 of the inventive mechanisms discussed above operating when the disk surface 12 bends down 14-A, and FIGS. 3C and 3D show cross section and radial-directional views through the disk 14 of a first inventive mechanism operating when the disk surface 12 bends up 14-B.

Throughout this document, the read-write head position when the disk surface is flat is denoted A0, and when bent is denoted A1. The track position when the disk surface is flat is denoted B0, and when bent, is denoted B1. δ refers to the amount of this off-track movement, or the distance between A1 and B1. δ1 refers to the distance between A0 and A1. δ2 refers to the distance between B0 and B1.

This head-disk surface interface allows the use of the formula δ=δ1+δ2, for the motion of FIGS. 3A and 3C, given that A0-B0 and A1-B1 are essentially 0, because $$\text{Distance}(A1 - B1) = \text{Distance}(A1 - A0 + A0 - B1 + B0 - B0)$$

$$= \text{Distance}((A1 - A0) + (B0 - B1) + (A0 - B0))$$

$$\approx \text{Distance}((A1 - A0) + (B0 - B1))$$

$$\delta \approx \delta 1 + \delta 2 = 0.$$

In FIGS. 3A and 3C, $\delta 2 = td/2*\theta = -\delta 1$.

Each of the previously mentioned approaches will be discussed in more detail below.

FIGS. 4A to 6A, and 7A, show several means for moving the slider parallel to a disk surface. Including moving the actuator arm by a lever action through the principal axis with the slider aligned at a bias angle 710, when the slider face is essentially parallel to the disk surface.

With respect to the track when the disk surface is flat, FIGS. 4A to 6A, and 7A, show the means for radially moving the slider. Each of which includes a means for the lever action to cause the slider to move radially bent. More specifically, the lever action through the principal axis at the bias angle 710, causes the radial motion of the slider. In these Figures, the dynamics of the head-disk interface determine the bias angle 710, which is preferably between plus and minus 10 degrees from zero.

Figure 4A:
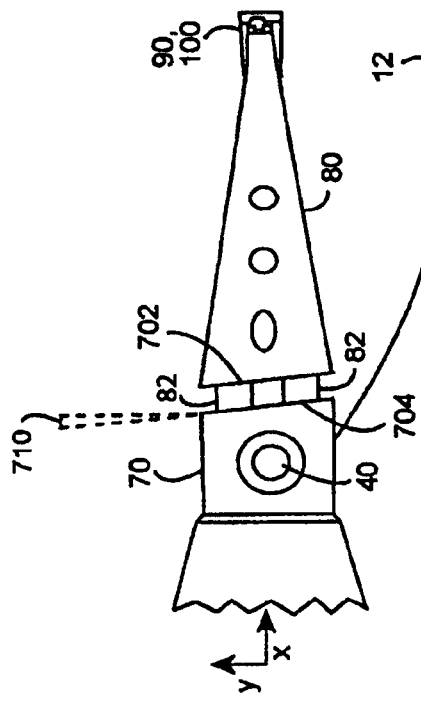

In FIG. 4A, a head gimbal assembly includes a suspension having bias angle 710, attached by connection beam 82 to extended base plate 84. The suspension mounts on the actuator arm, at bent edge 700 of extended base plate 84 and at bent edge 702 of load beam 80.

Figure 4B:
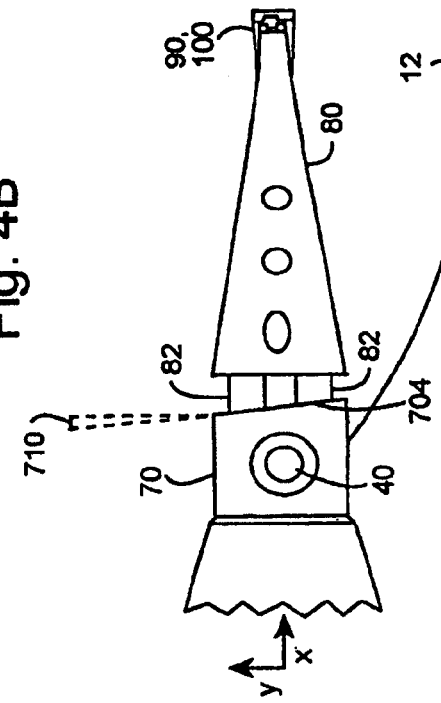

In FIG. 4B, a head gimbal assembly includes a suspension having bias angle 710, attached to base plate 70. It mounts on the actuator arm, at bent edge 704 of base plate 70 and at bent edge 700 of load beam 80.

Figure 4C:
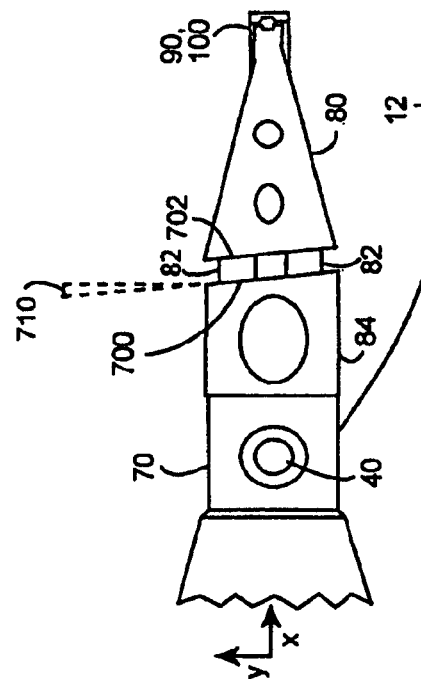

In FIG. 4C, a head gimbal assembly includes a suspension having bias angle 710, attached by connection beam 82 to extended base plate 84. This is mounted on the actuator arm, at the bent edge 700 of the extended base plate 84.

Figure 4D:
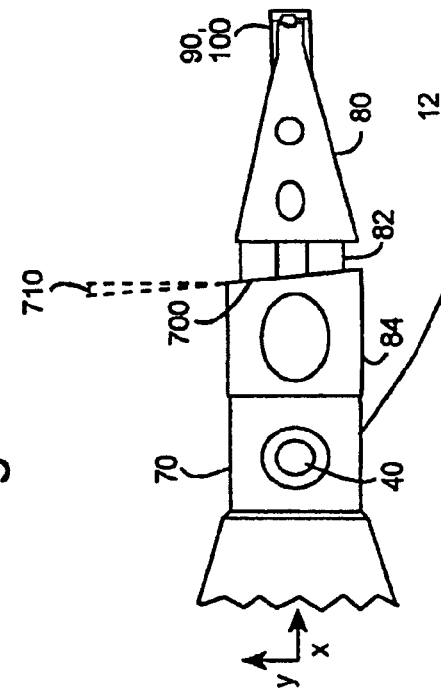

In FIG. 4D, a head gimbal assembly includes a suspension having bias angle 710, attached to base plate 70, which is mounted on the actuator arm, at bent edge 704 of base plate 70.

FIGS. 4A to 6B, and 7A, show the second inventive mechanism for reducing TMR. This includes the means for moving the actuator arm coupled to the load beam via two fingers. The first finger flexes differently from the second finger when the disk surface is bent. The first finger flexes differently from the second finger, causing the slider to move radially with respect to the track when the disk surface is bent.

Figure 5B:
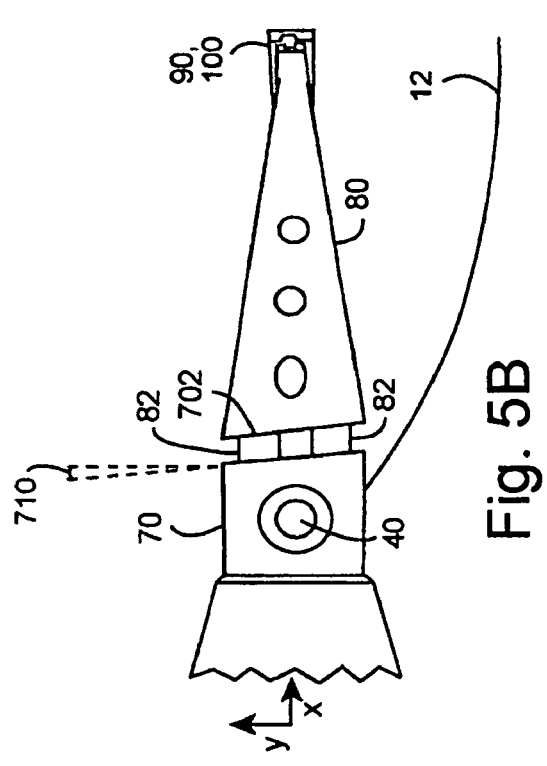
Figure 5D:
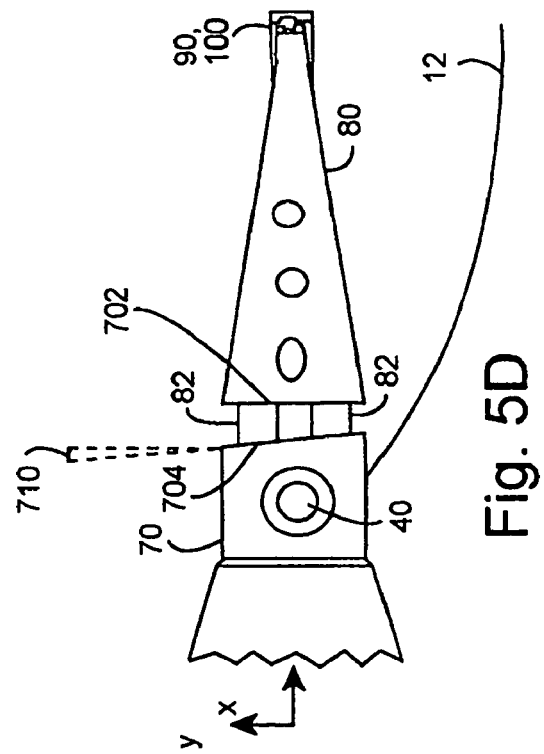
Figure 5A:
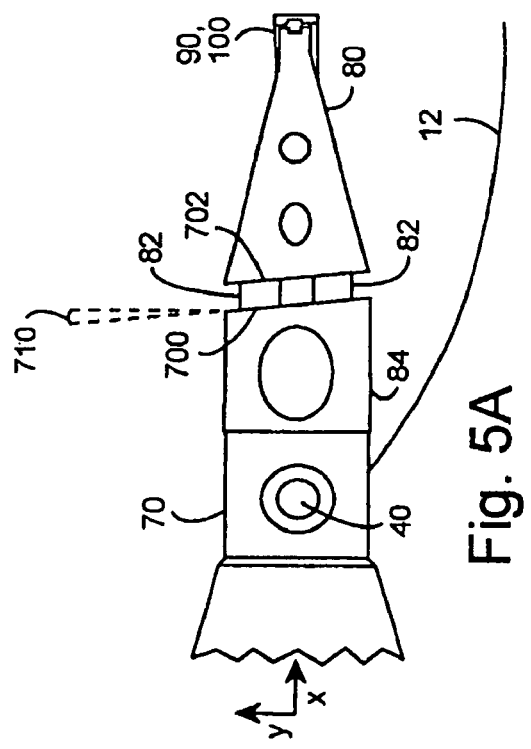
Figure 5C:
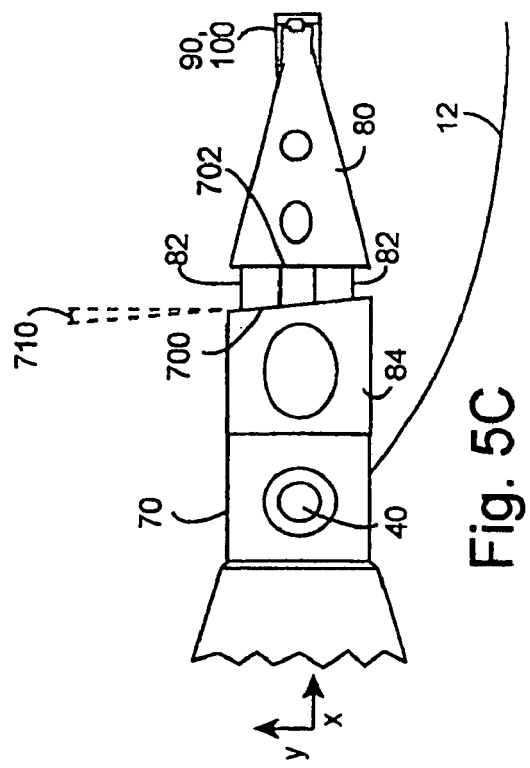
Figure 6A:
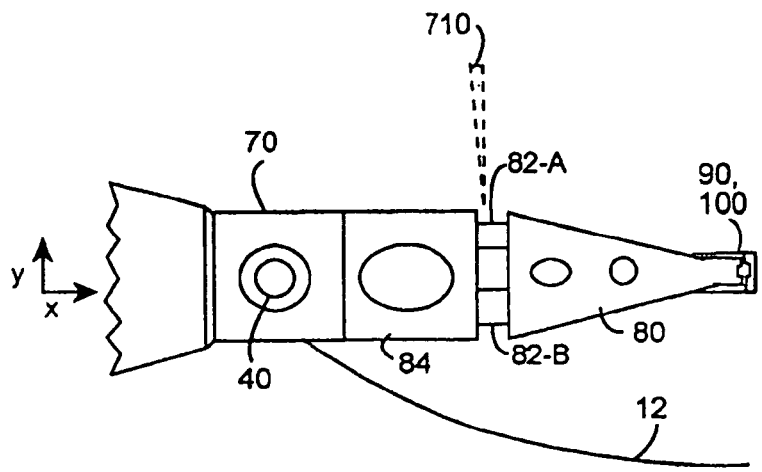
Figure 6B:
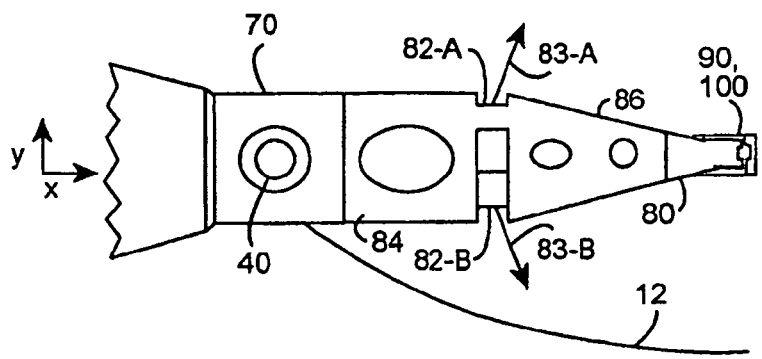
FIGS. 6B to 6E are views of head gimbal assemblies of the second inventive mechanism.
Figure 6C:
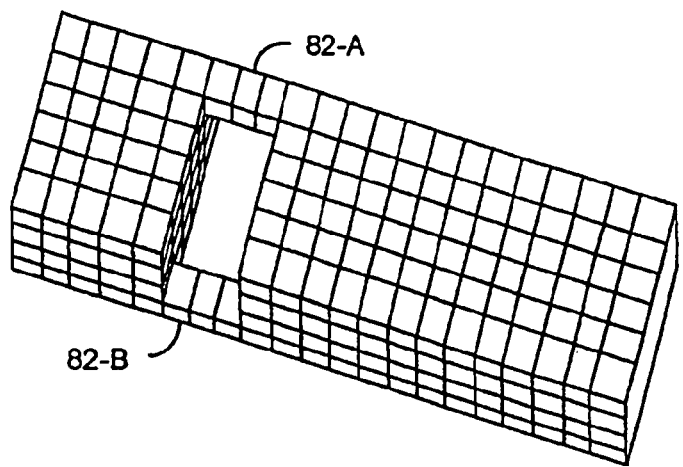
Figure 6D:
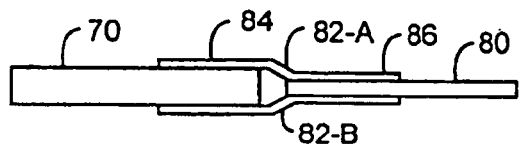
Figure 6E:
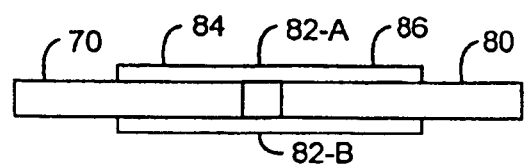

In particular, FIGS. 6B to 6E show embodiment of the second mechanism, which do not involve a bias angle 710 as shown in FIGS. 4A to 6A and 7A. FIG. 6B shows a top view of a head gimbal assembly, based upon the difference in the connection beam fingers 82-A and 82-B connecting up 83-A and down 83-B, respectively. Finger 82-A flexes differently from finger 82-B, causing slider 100 to move radially with respect to the track, as disk surface 12 is bent. FIG. 6C shows fingers 82-A and 82-B connecting up and down on the upper connection beam 86 and lower connection beam, as in FIG. 6E. FIGS. 6D and 6E show side views of the head gimbal assembly of FIG. 6B when the thickness of the base plate 70 and load beam 80 differ, or are the same, respectively. Extended base plate 84, finger 82-A, and upper connection beam 86 are preferably made from one sheet of metal, preferably stainless steel.

Figure 7A:
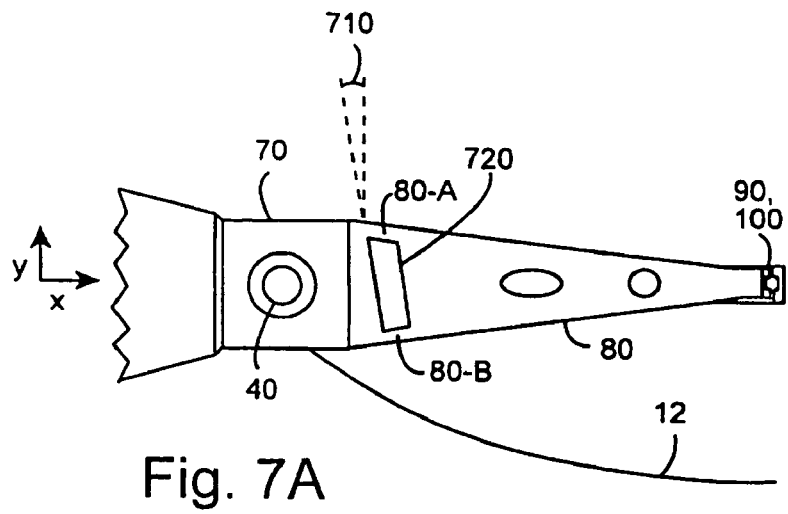
FIG. 7A is a top view of a head gimbal assembly of the first and second inventive mechanisms.

FIG. 7A shows a top view of suspension 80 attached to base plate 70 using a cutout 720 to create fingers 80-A and 80-B, which together form bias angle 710. The bias angle 710 can be determined by the dynamics of the head-disk interface, the shape of cut-out 720, and the stiffness of load beam 80.

FIGS. 7B to 8D show examples of a third inventive mechanisms for reducing TMR. This includes moving the actuator arm by the lever action through the principal axis when the slider is parallel to the disk surface. The slider is mounted on a flexure at a second bias angle 712 to the principal axis. The means for radially moving the slider includes the flexure 94 responding as the disk surface bends through the second bias angle, causing the slider to move radially toward the track.

Figure 7B:
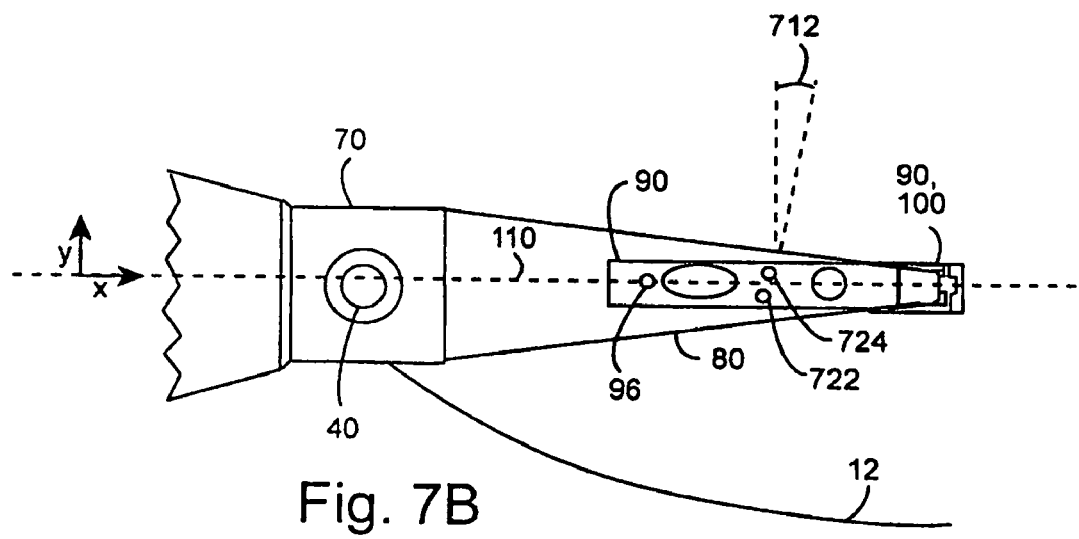

FIG. 7B shows a top view of the suspension attached to base plate 70, with two points 722 and 724 welding flexure 90 to load beam 80, providing bias angle 710. Flexure 90 attaches to both slider 100 and to load beam 80. The number of welding points close to the slider is preferably at least two. If the line between welding points is not perpendicular to the principal axis 110, then the trajectory of bending motion of the flexure induced by disk axial vibration will be on a tilted bending line. It is sometimes preferred that the line, between the welding points 722 and 724, is not perpendicular to the principal axis 110.

FIGS. 9A to 9F show radial head motions for the head gimbal assembly of FIG. 8D, due to the bending motion of the flexure gimbal 92 induced by disk axial vibration. In FIGS. 9B, 9D, and 9F, the trajectory of head, moves about the tilted bending line 740. This line is preferably in a range of plus or minus 10 degrees of arc from zero labeled as 730.

FIGS. 10A to 10F show radial head motions for the head gimbal assembly of FIG. 7B, according to the bending motion of the flexure gimbal induced by the disk axial vibration. In FIGS. 10B, 10D, and 10F, the trajectory of head, moves about the tilted bending line 740 from line 750. This line is again, preferably, in a range of plus or minus 10 degrees of arc from zero as shown by g0, g1 and g2.

Embodiments of a third set of example mechanisms built according to the invention are shown in FIGS. 7B through 8D. FIGS. 11A to 11D show various views of this set of mechanisms.

Figure 11A:
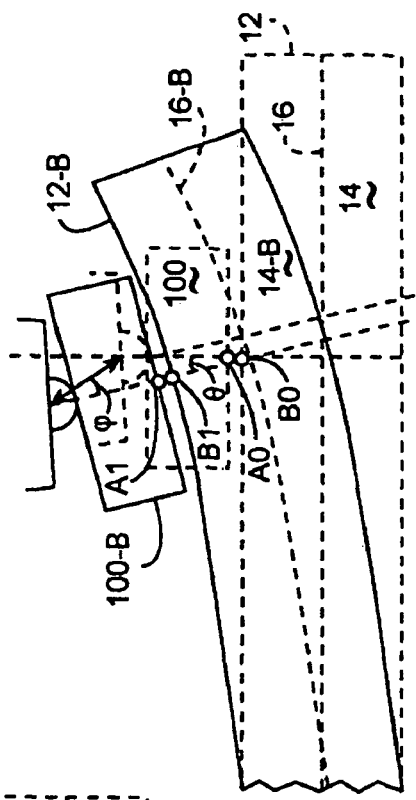
FIGS. 11A and 11B are cross section and radial-directional views, through the disk, of the mechanisms of FIGS. 7B through 8D operating when the disk surface bends down.
Figure 11B:
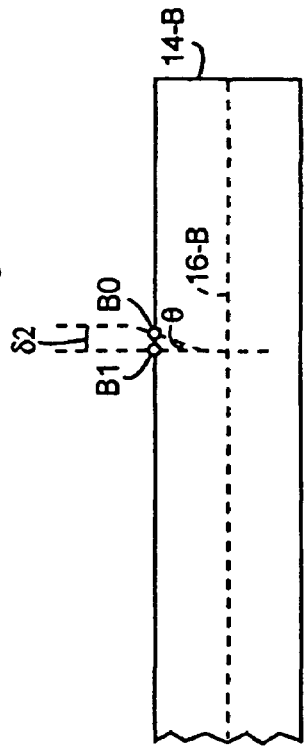

FIG. 11A shows a cross section view, through disk 14 when the disk surface 12 bends down 12-A. FIG. 11B shows a radial-directional view when disk surface 12 bends up 12-B.

Figure 11C:
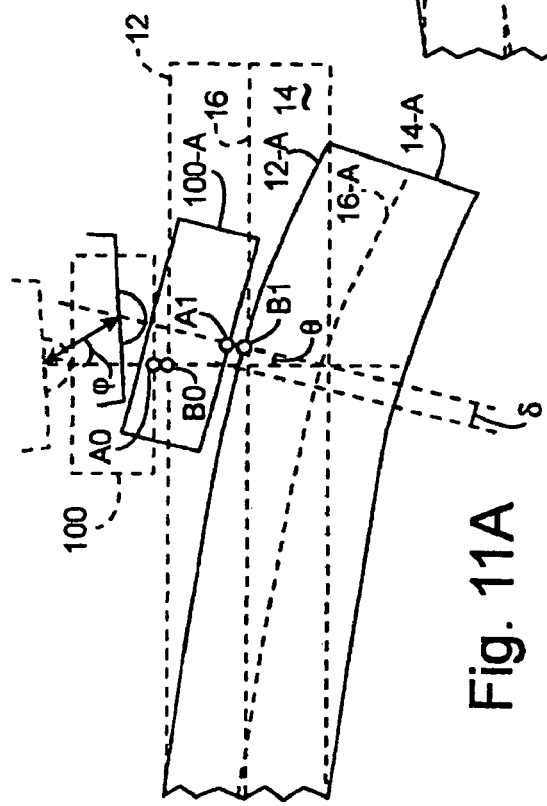
FIGS. 11C and 11D are cross section and radial-directional views, through the disk, of the mechanisms of FIGS. 7B through 8D operating when the disk surface bends up.
Figure 11D:
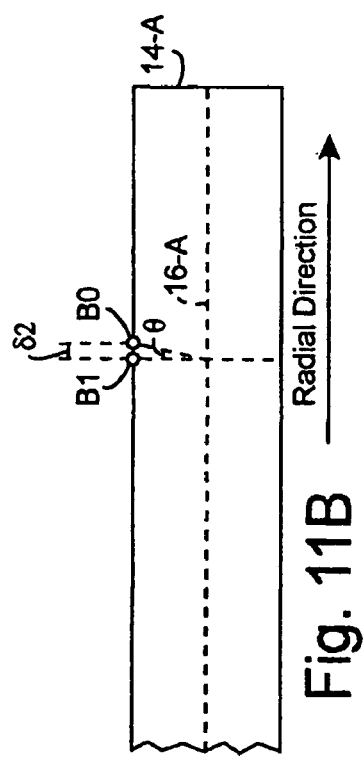

FIG. 11C shows a cross section view when the disk surface 12 bends up 12-B. FIG. 11D shows a radial-directional view when the disk surface 12 bends up 12-B.

It is reasonable to use the formula $\delta = \delta 1 - \delta 2 = 0$, for the motion of FIGS. 11A and 11C, since A0-B0 and A1-B1 are essentially 0, leading, as in FIG. 3C, to $\delta 2 = td/2*\theta = -\delta 1$.

Figure 12:
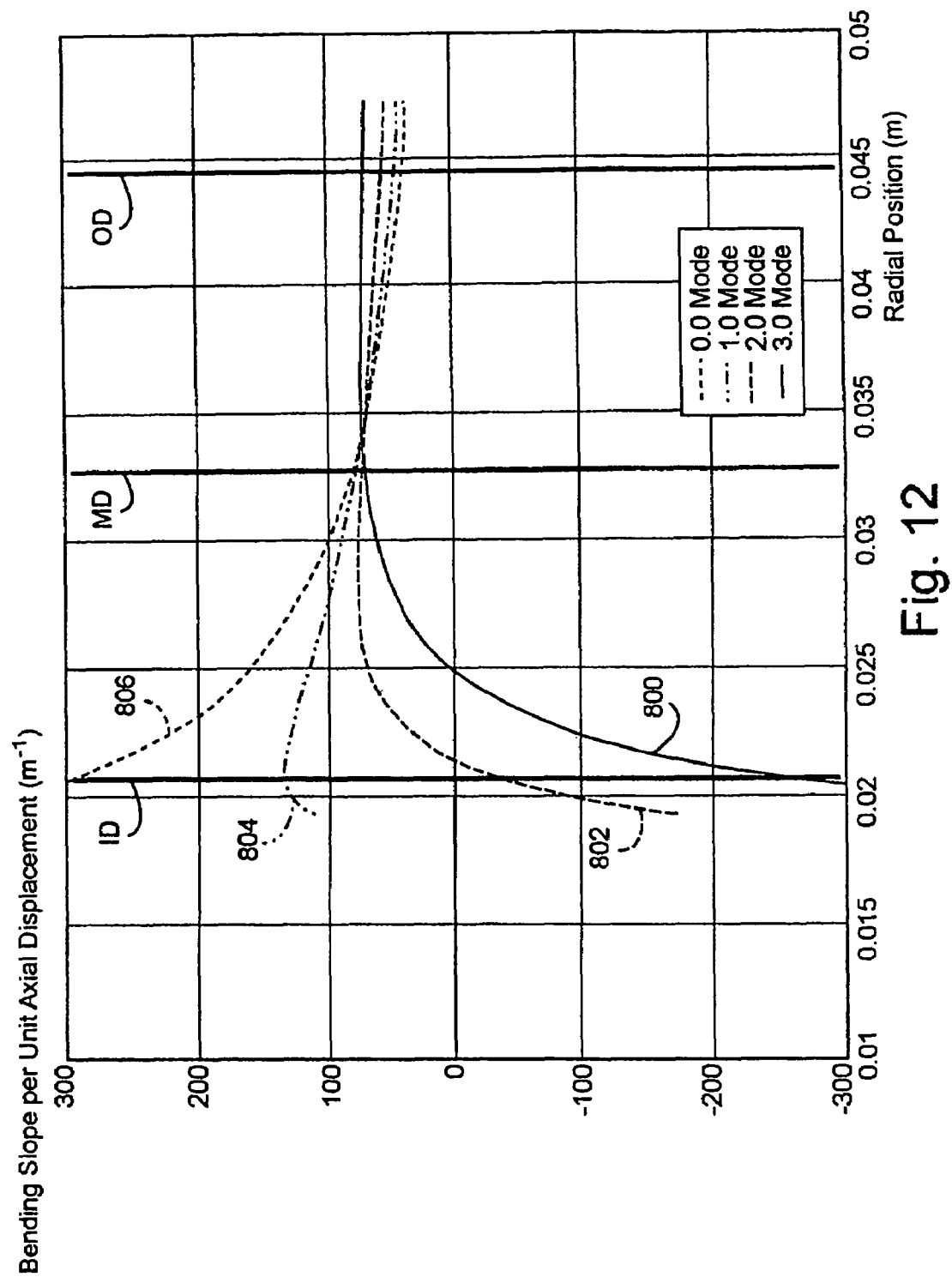
FIG. 12 is a graph of the results of the bending slope per unit of axial displacement for four common bending modes for various radial positions and ID through OD.

FIG. 12 shows the results of the bending slope per unit axial displacement, for various radial positions for four common bending modes for ID through OD. The horizontal axis indicates radial position in terms of meters. The vertical axis indicates the bending slope per unit axial displacement in terms of 1/meter. Trace 800 indicates the results for bending mode (3, 0). Trace 802 indicates the results in bending mode (2, 0). Trace 804 indicates the results in bending mode (1, 0). Trace 806 indicates the results in bending mode (0, 0).

Figure 13A:
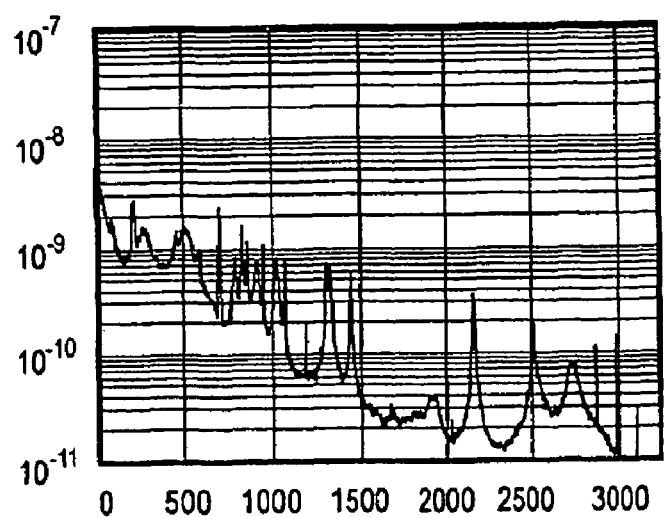
FIGS. 13A, 13B, and 13C are graphs summarizing results regarding the power spectral density function in terms of axial vibration frequency versus displacement in meters at ID, at MD, and at OD, respectively.
Figure 13B:
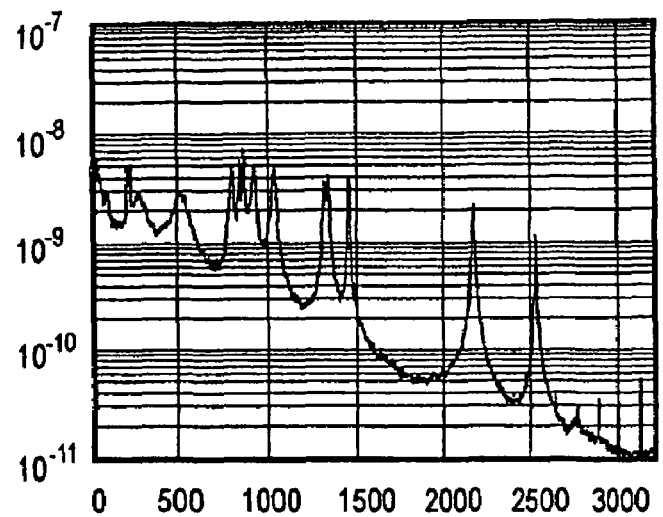
Figure 13C:
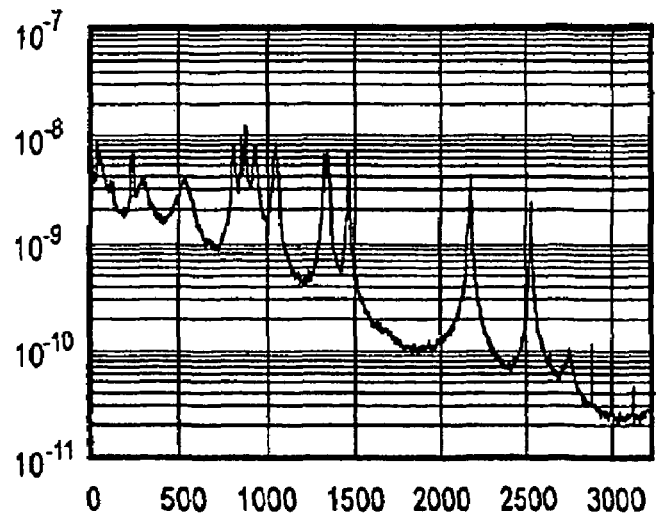

FIGS. 13A, 13B, and 13C summarize results regarding the power spectral density function in terms of axial vibration frequency versus displacement in meters at ID, at MD, and at OD, respectively.

In FIGS. 12 through 13C, the experimental hard disk drive was rotating at 7200 RPM.

Figure 14D:
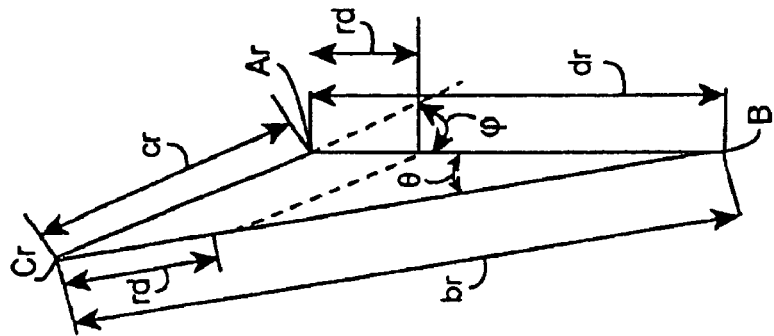
FIG. 14D is the geometric analysis used for the roll bias angle formula for the roll center mechanisms of FIGS. 4A to 7A when the disk surface bends up as in FIG. 9A.
Figure 14C:
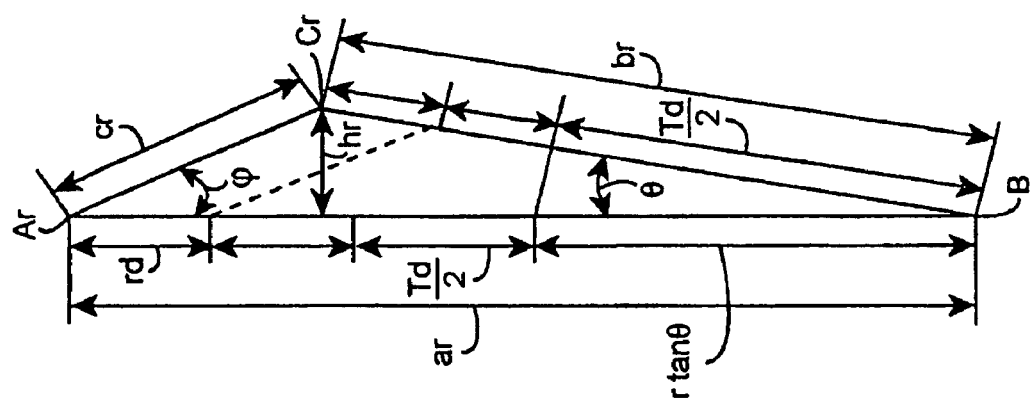
FIG. 14C is the geometric analysis used for the roll bias angle formula for the roll center mechanisms of FIGS. 4A to 7A when the disk surface bends down as in FIG. 8A.
Figure 14B:
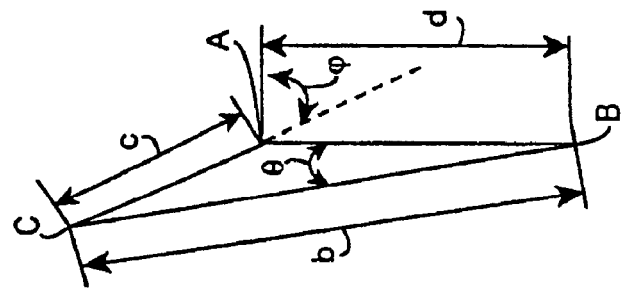
FIG. 14B is the geometric analysis used for the roll bias angle formula for the mechanisms of FIGS. 7B to 8D, when the disk surface bends up as in FIG. 11C.
Figure 14A:
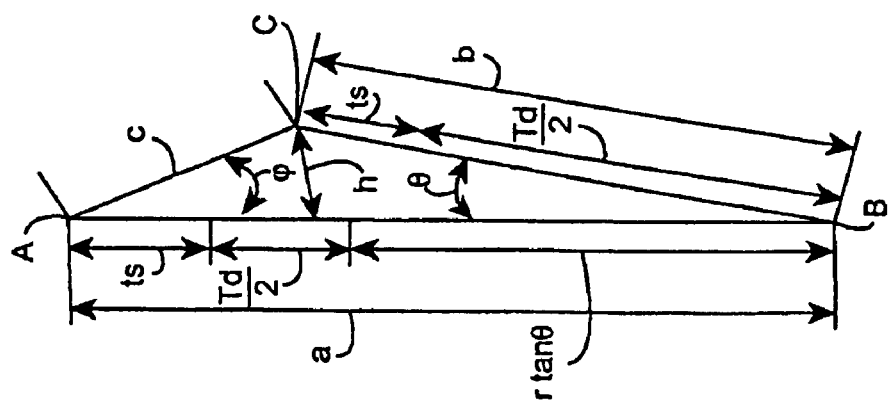
FIG. 14A is the geometric analysis used for the roll bias angle formula for the mechanisms of FIGS. 7B to 8D when the disk surface bends down as in FIG. 11A.

FIGS. 14A and 14B show the geometric analysis used for the bias angle 710 formula for the mechanisms of FIGS. 7B to 8D when the disk surface bends down as in FIG. 11A and bent up as in FIG. 11C. In these Figures:

A refers to the upper center point of slider 100 for the stationary state.

C refers to upper center point of slider 100 for the disk spinning state.

c refers to a deformed track 18 on the spinning disk surface 12.

ts refers to the thickness of slider 100.

td refers to the thickness of disk 14.

θ refers to the disk bending angle.

r refers to the radius of the disk, which is preferably 45 mm.

φ refers to the roll bias angle, which is portrayed in FIGS. 7B to 8D by reference number 710.

In FIGS. 14A to 14D, the bending angle per unit of axial vibration at r was experimentally determined to be 75/m for bending mode (3, 0), 60/m for bending mode (2, 0), 50/m for bending mode (1, 0), and 40/m for bending mode (0, 0).

The bias angle 710 of the earlier Figures is the roll bias angle φ of FIGS. 14A-16C. In FIG. 14A, the roll bias angle φ=arc cos((a−b cos θ)/c) for the disk bending down. In FIG. 14B, the roll bias angle φ=arc cos ((b cos θ−d)/c) for the disk bending up. This leads to φ≈1.2 degrees of arc at the Outside position of Disk OD, with r=45 mm. In FIGS. 14A and 14B, the radial motion of slider 100 is about h=b*sin θ=(ts+td/2) sin θ.

FIG. 14C shows the geometric analysis of the roll bias angle 710 formula for the roll center mechanisms of FIGS. 4A to 6A, and 7A, when the disk surface bends down as in FIG. 8A.

FIG. 14D shows the geometric analysis of the roll bias angle 710 formula for the roll center mechanisms of FIGS. 4A to 6A, and 7A, when the disk surface bends up as in FIG. 9A.

In FIGS. 14C and 14D:

Ar refers to the roll center for the stationary state.

Cr refers to roll center for the disk spinning state.

c refers to a deformed track 18 on the spinning disk surface 12.

ts refers to the thickness of slider 100.

td refers to the thickness of disk 14.

θ refers to the disk bending angle.

r refers to the radius of the disk, which is preferably 45 mm.

φ refers to the roll bias angle, which is portrayed in FIGS. 4A to 6A, and 7A by reference number 710.

In FIG. 14C, the roll bias angle φ=arc cos((ar−br cos θ)/cr) for the disk bending down. In FIG. 14D, the roll bias angle φ=arc cos((br cos θ−dr)/cr) for the disk bending up. This leads to φ≈1.6 degrees of arc at the Outside position of Disk OD, with r=45 mm.

Drive level experiments were conducted on two types of production hard disk drives with the roll biased load beam built to move the roll center radially as shown in FIG. 5A. The hard disk drives operated at 56,000 TPI at 7200 RPM and at 93,000 TPI at 7200 RPM. Both types of hard disk drives were able to move the roll center radially with the biased load beam.

Skew angles as used herein refer to the angular difference from the perpendicular of the principal axis 110 of the actuator with respect to the tangent of the track 18. In the experimental hard disk drives, the skew angle at OD is about 13.1 degrees arc, at MD about −5 degrees arc, and at ID about −18 degrees arc. Please refer to FIG. 1 for an illustration of these positions.

FIGS. 15A and 15B show the results regarding the bending angle versus the roll bias angle at OD when the disk bends down and up, respectively. The vertical axes represent the roll bias angle φ (710) in terms of degrees arc. The horizontal axes represent the bending angle in units of $10^{-5}$ degrees of arc.

Figure 16A:
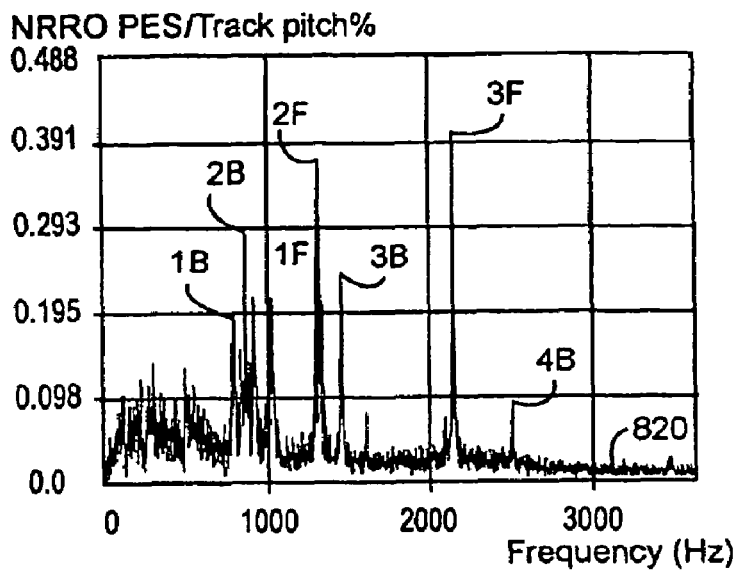
FIG. 16A is a graph summarizing the spectral density of NRRO PES/Track pitch measure in percent versus vibrational frequency for a disk-head gimbal assembly with a roll bias angle of zero degrees, which is standard in conventional hard disk drives.
Figure 16B:
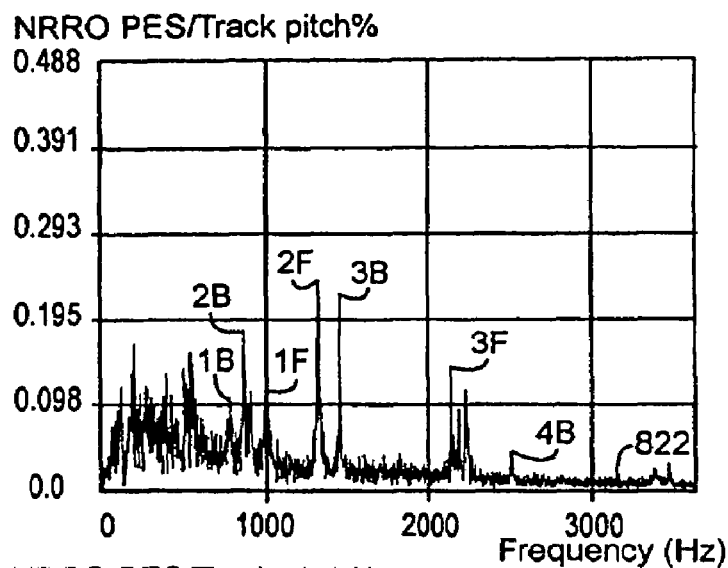
FIGS. 16B and 16C are graphs summarizing the spectral densities of NRRO PES/Track pitch measure in percent versus vibrational frequency for a disk-head gimbal assembly with a roll bias angle of one degree and of two degrees, respectively.
Figure 16C:
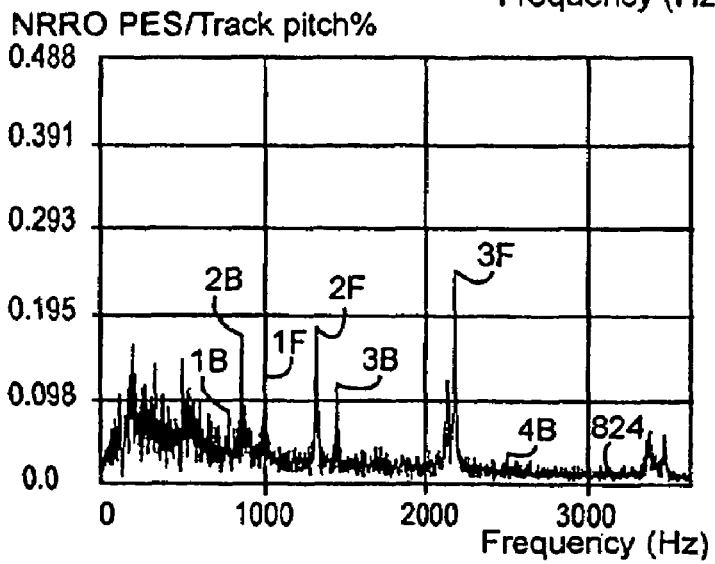

The roll biased load beam acts to attenuate several peaks related to disk modes in the spectrum of the non-repeatable run-out (NRRO) PES signal, shown in FIGS. 16A-16C. In addition, the repeatable run-out (RRO) level is also attenuated, because of the attenuation of the NRRO in the writing of the servo track. The results in the following table are for tracks near OD.

| Roll bias angle | Std-RRO (%) | Std-NRRO (%) | Std-Total (%) |
|---|---|---|---|
| Standard (0) | 1.582 | 1.855 | 2.441 |
| One degree | 1.484 | 1.465 | 2.070 |
| Two degrees | 1.328 | 1.406 | 1.936 |

FIG. 16A summarizes the spectral density 820 of NRRO PES/Track pitch measure in percent versus vibrational frequency for a disk-head gimbal assembly with no roll bias angle, which is standard in conventional hard disk drives. FIGS. 16B and 16C summarize the spectral densities 822 and 824 of NRRO PES/Track pitch measure in percent versus vibrational frequency for a disk-head gimbal assembly with a roll bias angle of one degree and of two degrees, respectively.

In FIGS. 16A to 16C, the vertical axis represents NRRO per track pitch as a percentage. The horizontal axis represents vibrational frequency in Herz.

Reference labels 1B and 1F represent the backward frequency and the forward frequency associated with bending mode (1, 0).

Reference labels 2B and 2F represent the backward frequency and the forward frequency associated with bending mode (2, 0).

Reference labels 3B and 3F represent the backward frequency and the forward frequency associated with bending mode (3, 0).

Reference labels 4B and 4F represent the backward frequency and the forward frequency associated with bending mode (4, 0).

TMR is further reduced by reconfiguring the servo controller 240 of FIG. 2 for roll biased head gimbal assemblies, by sacrificing gain in the disk vibration region of the spectrum and increasing suppression in the low frequency region. In conventional hard disk drives, gain in the disk vibration frequency range cannot be sacrificed.

Figure 17:
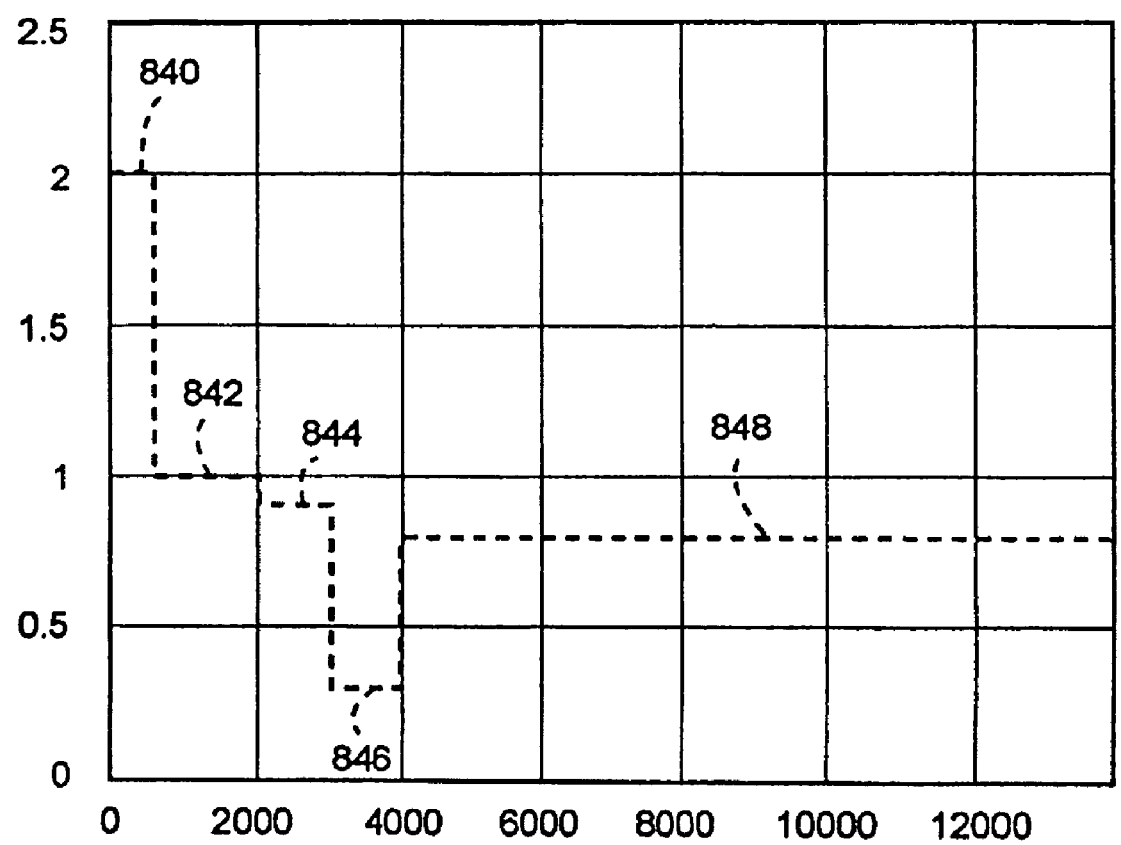
FIG. 17 is a graph of a weight function for PES feedback in the frequency domain trading servo controller gain in disk vibration frequency range for increased rejection of low frequency disturbances.

FIG. 17 shows a weight function 840-848 for PES feedback in the frequency domain. The servo controller gain in disk vibration frequency range 842 to 846 is traded for increased rejection of low frequency disturbances 840. FIG. 17 was derived by a random search method with the weighted function for PES in the neighborhood ranges, 840-848.

Figure 18:
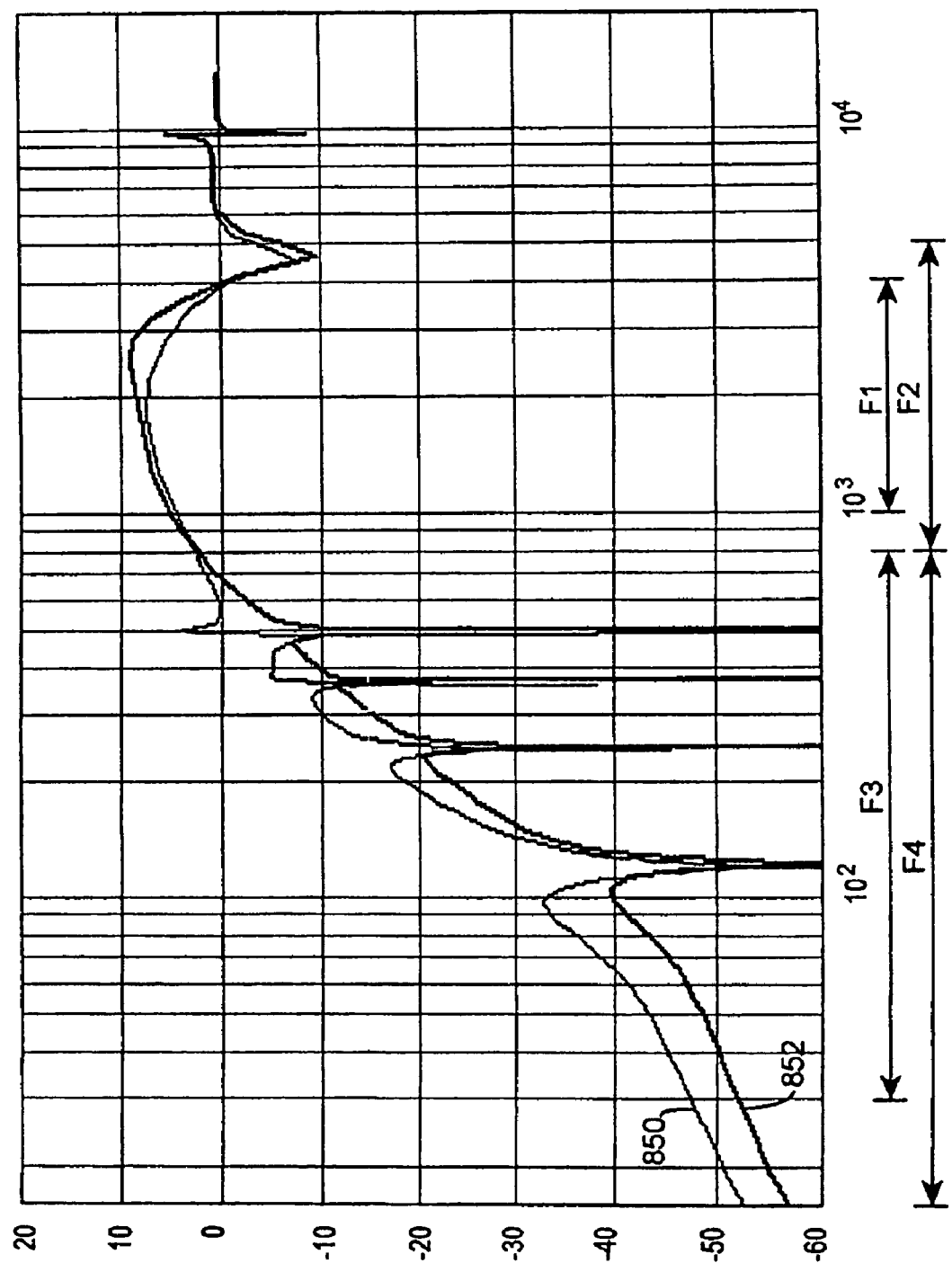
FIG. 18 is a graph of the error sensitivity function of the original servo controller and the modified servo controller as derived from FIG. 17.

FIG. 18 shows the error sensitivity function of the original servo controller 850 and the modified servo controller 852 as derived from FIG. 17. The vertical axis represents the error sensitivity in decibels. The horizontal axis represents the disk vibrational frequency in Herz.

F1 indicates a definition of disk vibration frequency range, from 1K Hz to 3K Hz. F2 indicates an alternative definition, from 800 Hz to 4K Hz.

F3 indicates a definition of low frequency range from 17 Hz to 800 Hz. F4 indicates an alternative definition, from 0 Hz to 800 Hz.

The preferred definition of disk vibration frequency range may vary among hard disk drives, possibly including higher and/or lower frequencies.

The preferred definition of low frequency range may vary among hard disk drives, possibly including higher and/or lower frequencies.

Figure 19:
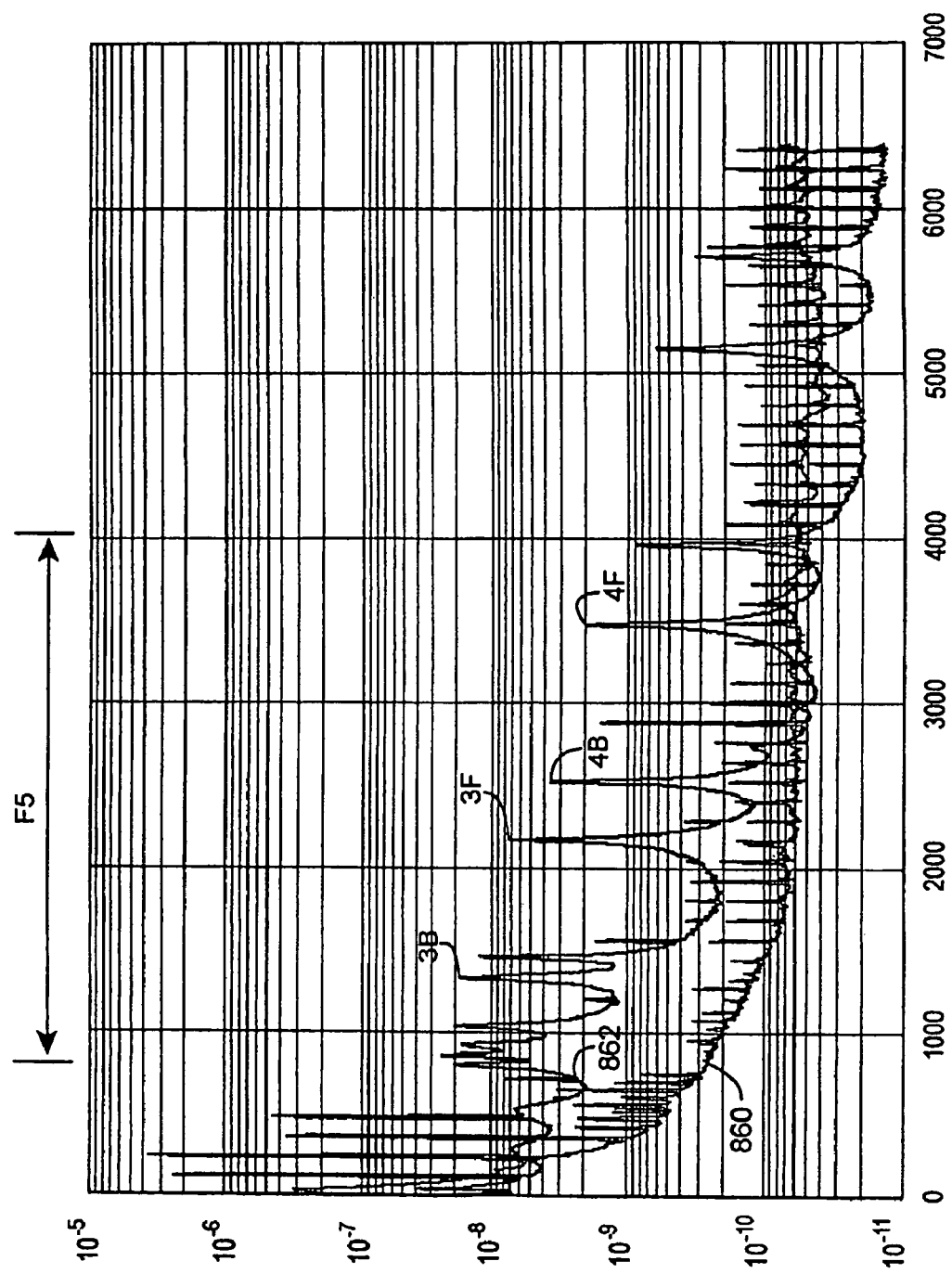
FIG. 19 is a graph of the mechanical disturbance spectra of the in-plane torque disturbance spectrum and out-of-plane disk disturbance spectrum.

FIG. 19 shows the mechanical disturbance spectra. Trace 860 represents the in-plane torque disturbance spectrum. Trace 862 represents the out-of-plane disk disturbance spectrum. References labels 3B, 3F, 4B, and 4F represent backward and forward resonance of bending modes (3, 0) and (4, 0). The vertical axis represents displacement on a logarithmic scale. The horizontal axis represents mechanical vibration in Herz.

Figure 20:
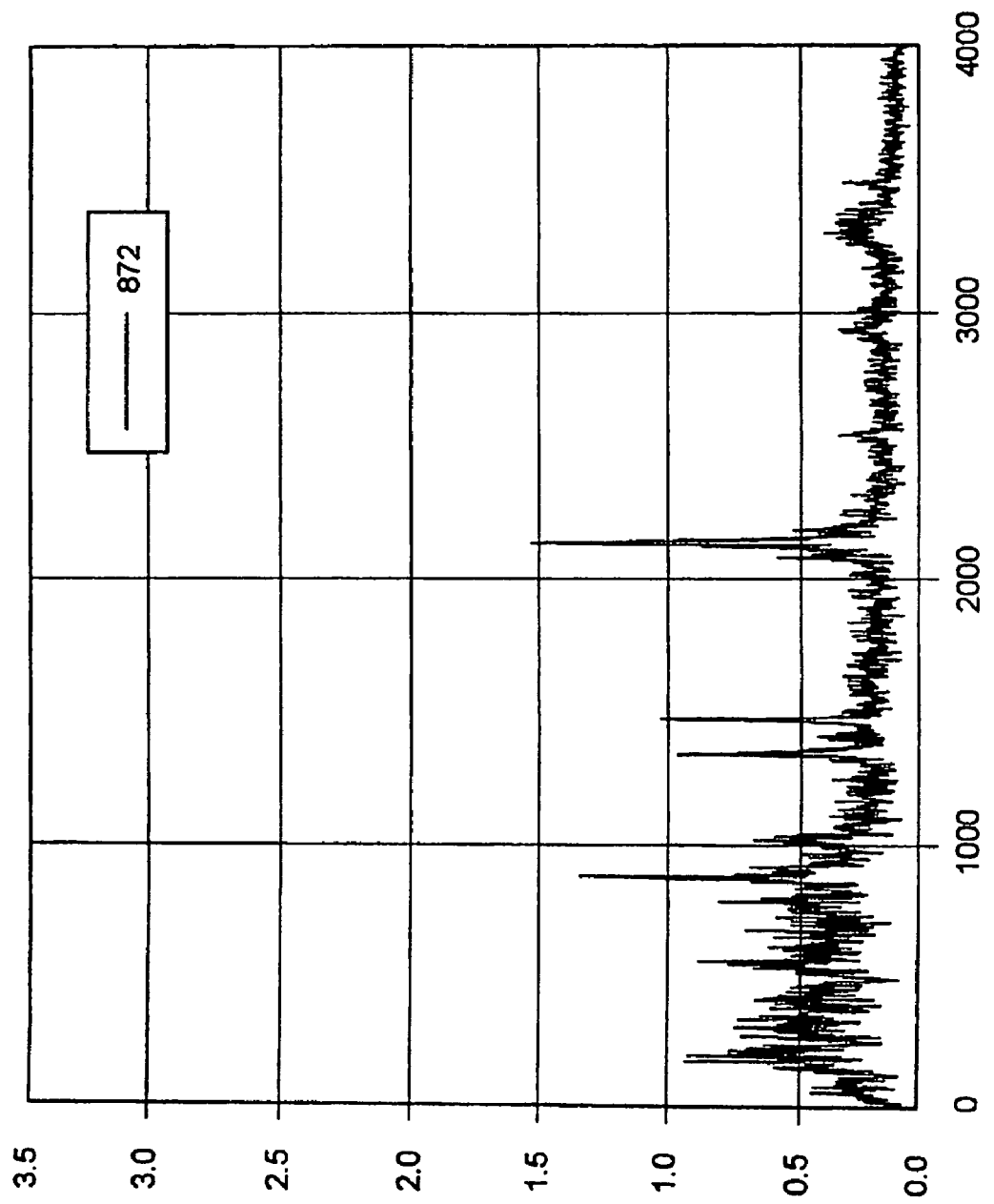
FIGS. 20 and 21 are graphs of the results regarding a conventional disk-head gimbal assembly interface, compared to a head-gimbal assembly, with a two degree roll bias angle, operated with the modified servo-controller.
Figure 21:
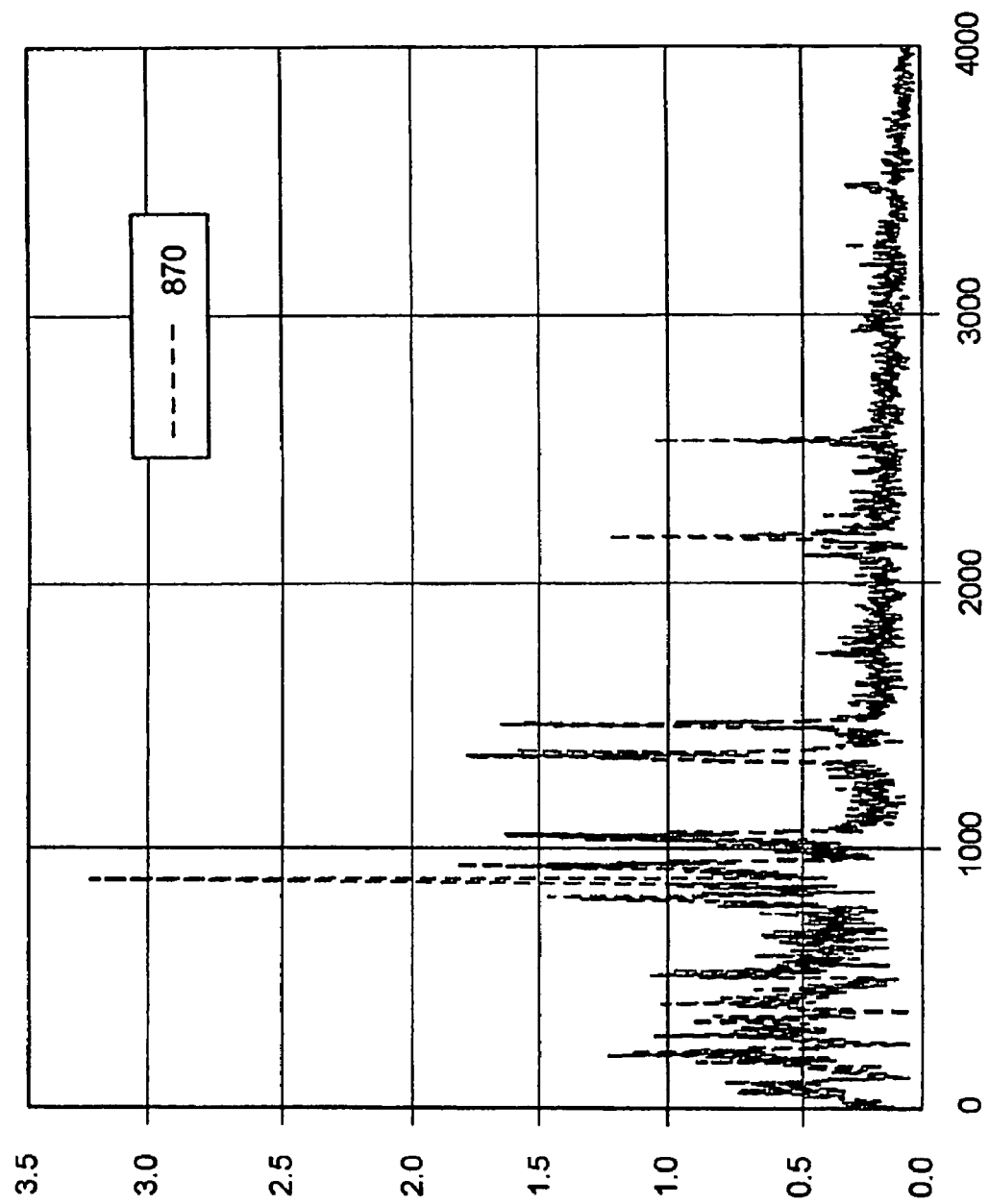

FIGS. 20 and 21 show the results regarding a conventional disk-head gimbal assembly interface 870, compared to a head-gimbal assembly with a two degree roll bias angle, operated with the modified servo-controller 872. Trace 870 represents a conventional disk and head gimbal assembly interface with a total NRRO PES of 2.578%. Trace 872 represents the experimental hard disk drive with a roll bias angle of two degrees operated by the modified servo-controller, having a total NRRO PES of 1.621%. This is a significant reduction in TMR, as measured by PES.

The invention includes applying this servo-controller scheme to any TMR reducing mechanism showing favorable results when trading off gain at the disk vibration frequency range in favor of increased rejection of low frequency disturbances.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of moving a slider toward a track on a disk surface in a hard disk drive, to minimize track mis-registration, comprising the steps of:

moving said slider parallel to said disk surface toward said track, when said disk surface is flat, with an actuator arm moving by a lever action through a principal axis with said slider aligned at a bias angle;

wherein a read-write head is encapsulated in said slider facing said rotating disk surface about a radial center in a hard disk drive;

wherein said read-write head is communicatively coupled with said rotating disk surface to communicatively access said track;

wherein said method further comprising the step of:

radially moving said slider toward said track, when said disk surface is bent, by said lever action through said principal axis at said bias angle causing said slider to move radially toward said track, when said disk surface is bent.

2. The method of claim 1, wherein the step moving said slider parallel said disk surface arm further comprising the step of:

said actuator arm moving, through a flexure, said slider mounted to said flexure at a second bias angle to said principal axis;

wherein the step radially moving said slider further comprising the step of:

said flexure responding as said disk surface is bent, through said second bias angle, causing said slider to move radially toward said track.

3. The method of claim 2, wherein said flexure is mounted to said actuator arm at said second bias angle.

4. The method of claim 3, wherein at least two welds mount said flexure to said actuator arm at said second bias angle.

5. The method of claim 4, wherein said at least two welds mount said flexure to a load beam coupled to said actuator arm at said second bias angle.

6. The method of claim 2, wherein said slider is mounted to said flexure at said second bias angle.

7. The method of claim 2, wherein said second bias angle is between one-half degree and three degrees.

8. The method of claim 7, wherein said second bias angle is between three-quarters degree and five-halves degrees.

9. The method of claim 1, wherein said actuator arm includes said slider attached through a flexure to a load beam;

wherein said load beam is aligned to said principal axis at said bias angle.

10. The method of claim 9, wherein said actuator arm includes an extended base plate with a bent edge attaching to a bent edge of said load beam to create said load beam aligned to said principal axis at said bias angle.

11. The method of claim 9, wherein said actuator arm includes a mounting surface base plate with a bent edge attaching to said load beam to create said load beam aligned to said principal axis at said bias angle.

12. The method claim 11, wherein said actuator arm includes said mounting surface base plate with said bent edge attaching to a bent edge of said load beam to create said load beam aligned to said principal axis at said bias angle.

13. The method claim 12, wherein said actuator arm includes said mounting surface base plate with said bent edge attaching through a connection beam to said bent edge of said load beam to create said load beam aligned to said principal axis at said bias angle.

14. The method of claim 9, wherein said actuator arm includes an extended base plate with a bent edge attaching to said load beam to create said load beam aligned to said principal axis at said bias angle.

15. The method of claim 14, wherein said actuator arm includes said extended base plate with said bent edge attaching to a bent edge of said load beam to create said load beam aligned to said principal axis at said bias angle.

16. The method of claim 15, wherein said actuator arm includes said extended base plate with said bent edge attaching through a connection beam to said bent edge of said load beam to create said load beam aligned to said principal axis at said bias angle.

* * * * *